US010298945B2

(12) United States Patent
Matsuo et al.

(10) Patent No.: US 10,298,945 B2
(45) Date of Patent: May 21, 2019

(54) VIDEO ENCODING METHOD, VIDEO DECODING METHOD, VIDEO ENCODING APPARATUS, VIDEO DECODING APPARATUS, AND PROGRAMS THEREOF

(75) Inventors: Shohei Matsuo, Yokosuka (JP); Yukihiro Bandoh, Yokosuka (JP); Seishi Takamura, Yokosuka (JP); Hirohisa Jozawa, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 601 days.

(21) Appl. No.: 13/823,623

(22) PCT Filed: Sep. 20, 2011

(86) PCT No.: PCT/JP2011/071342
§ 371 (c)(1),
(2), (4) Date: Mar. 14, 2013

(87) PCT Pub. No.: WO2012/043298
PCT Pub. Date: Apr. 5, 2012

(65) Prior Publication Data
US 2013/0170554 A1 Jul. 4, 2013

(30) Foreign Application Priority Data
Sep. 30, 2010 (JP) .................. 2010-220560

(51) Int. Cl.
*H04N 19/46* (2014.01)
*H04N 19/117* (2014.01)
(Continued)

(52) U.S. Cl.
CPC ........... *H04N 19/46* (2014.11); *H04N 19/117* (2014.11); *H04N 19/14* (2014.11); *H04N 19/17* (2014.11);
(Continued)

(58) Field of Classification Search
CPC ...... H04N 7/50; H04N 7/262; H04N 7/26244; H04N 7/364; H04N 19/00587;
(Continued)

(56) References Cited

U.S. PATENT DOCUMENTS 6,940,907 B1 9/2005 Chen et al.
7,072,521 B1 * 7/2006 Cadwell ............... H04N 19/503
375/E7.137
(Continued)

FOREIGN PATENT DOCUMENTS

JP 04-144492 A 5/1992
JP 09-009251 A 1/1997
(Continued)

OTHER PUBLICATIONS

Office Action, Taiwanese Patent Application No. 100133882, dated Oct. 28, 2014.
(Continued)

*Primary Examiner* — Mohammed S Rahaman
*Assistant Examiner* — Jimmy S Lee
(74) *Attorney, Agent, or Firm* — Harness, Dickey & Pierce, P.L.C.

(57) ABSTRACT

Regions based on which an interpolation method of a fractional-accuracy pixel is switched are optimized, and the interpolation method is switched for each of the divided regions, thereby reducing residual energy of inter-frame prediction with motion compensation. A video encoding apparatus is provided with: an encoding information acquiring unit which acquires encoding information for each block; a region classification unit which performs a region classification on a block-by-block basis in accordance with the encoding information; a divided region redefinition processing unit which shifts a region dividing line in a horizontal direction, a region dividing line in a vertical
(Continued)

direction, or both the region dividing line in the horizontal direction and the region dividing line in the vertical direction based on a result of the region classification, and determines a region dividing line with which density of blocks belonging to a particular region classification is greater than or equal to a predetermined threshold value; an interpolation method switching unit which switches an interpolation method of a fractional-accuracy pixel for each of divided regions divided by the region dividing line; an interpolation performing unit which performs interpolation of the fractional-accuracy pixel for each of the divided regions; a picture encoding unit which encodes a picture using inter-frame prediction with motion compensation of fractional-accuracy for an interpolated picture; and a region classification information encoding unit which encodes information on the region classification.

20 Claims, 15 Drawing Sheets

(51) Int. Cl.
| | | |
|---|---|---|
| | H04N 19/14 | (2014.01) |
| | H04N 19/17 | (2014.01) |
| | H04N 19/523 | (2014.01) |
| | H04N 19/186 | (2014.01) |
| | H04N 19/182 | (2014.01) |

(52) U.S. Cl.
CPC ......... *H04N 19/523* (2014.11); *H04N 19/182* (2014.11); *H04N 19/186* (2014.11)

(58) Field of Classification Search
CPC ...... H04N 19/117; H04N 19/14; H04N 19/17; H04N 19/46; H04N 19/523
USPC .............................................. 375/240–240.29
See application file for complete search history.

(56) References Cited

U.S. PATENT DOCUMENTS

| | | | |
|---|---|---|---|
| 2003/0039312 A1* | 2/2003 | Horowitz ............ | H04N 19/159 375/240.24 |
| 2004/0017939 A1* | 1/2004 | Mehrotra ................. | G06T 9/00 382/173 |
| 2004/0131268 A1 | 7/2004 | Sekiguchi et al. | |
| 2006/0294171 A1 | 12/2006 | Bossen et al. | |
| 2007/0110159 A1* | 5/2007 | Wang .................... | H04N 19/139 375/240.16 |
| 2008/0063068 A1* | 3/2008 | Sekiguchi ............ | H04N 19/105 375/240.16 |
| 2008/0175322 A1 | 7/2008 | Lee et al. | |
| 2009/0067503 A1* | 3/2009 | Jeong ..................... | H04N 19/91 375/240.16 |
| 2009/0232206 A1* | 9/2009 | Boon ..................... | H04N 19/50 375/240.12 |
| 2009/0238283 A1* | 9/2009 | Han ...................... | H04N 19/105 375/240.16 |
| 2010/0074329 A1* | 3/2010 | Fu ........................ | H04N 19/147 375/240.12 |
| 2010/0074558 A1 | 3/2010 | Lim | |

FOREIGN PATENT DOCUMENTS

| | | | |
|---|---|---|---|
| JP | 2010-081240 A | | 4/2010 |
| JP | 2010-516082 A | | 5/2010 |
| KR | 2008-0044874 A | * | 2/2008 |
| KR | 2008-0044874 A | | 5/2008 |
| KR | 2010-0033712 A | * | 3/2010 |
| WO | 2006/108654 A2 | | 10/2006 |
| WO | WO-2008069073 A1 | | 6/2008 |
| WO | 2008/085109 A1 | | 7/2008 |
| WO | WO-2009047917 A1 | | 4/2009 |

OTHER PUBLICATIONS

Notice of Non-Final Rejection, Korean Patent Application No. 10-2013-7005413, dated Feb. 27, 2014.
Matsuo, Shohei, et al., "CE3: Modifications of region-based adaptive interpolation filter," Joint Collaborative Team on Video Coding of ITU-T SG16 WP3 and ISO/IEC JTC1/SC29/WG11, doc. JCTVC-F048, 6th Meeting: Torino, Italy, Jul. 14-22, 2011.
Matsuo, Shohei, et al., "CE3: Region-based adaptive interpolation filter," Joint Collaborative Team on Video Coding of ITU-T SG16 WP3 and ISO/IEC JTC1/SC29/WG11, doc. JCTVC-E078, 5th Meeting: Geneva, Switzerland, Mar. 16-23, 2011.
Matsuo, Shohei, et al., "Response to CE3: Region-based adaptive interpolation filter," Joint Collaborative Team on Video Coding of ITU-T SG16 WP3 and ISO/IEC JTC1/SC29/WG11, doc. JCTVC-D150, 4th Meeting: Daegu, South Korea, Jan. 20-28, 2011.
Matsuo, Shohei, et al., "Enhanced Region-Based Adaptive Interpolation Filter," 28th Picture Coding Symposium, Nagoya, Japan, Dec. 8-10, 2010, pp. 526-529.
Search Report, European Patent Application No. 11828855.4, dated Apr. 14, 2014.
Sakae Okubo, Shinya Kadono, Yoshihiro Kikuchi, and Teruhiko Suzuki, "H.264/AVC Textbook: 3rd Revised Edition", Impress R&D, pp. 119-123, 2009.
I. E. G. Richardson and G. J. Sullivan: "H.264 and MPEG-4 Video Compression", Wiley, pp. 172-175, 2003.
Marta Karczewicz, Yan Ye, and Peisong Chen: "Switched Interpolation Filter with Offset", ITU-T SGI6 Q.6 VCEG, VCEG-AI35, Berlin, Germany, Jul. 2008.
Marta Karczewicz, Yan Ye, Peisong Chen, and Giovanni Motta: "Single Pass Encoding using Switched Interpolation Filters with Offset", ITU-T SG16 Q.6 VCEG, VCEG-AJ29, San Diego, California, USA, Oct. 2008.
Y. Vatis, B. Edler, D. T. Nguyen, and J. Ostermann: "Motion-and aliasing—compensated prediction using a two-dimensional non-separable adaptive Wiener interpolation filter", Proc. ICIP2005, IEEE International Conference on Image Processing, pp. II 894-II 897, Genova, Italy, Sep. 2005.
S. Wittmann and T. Wedi: "Separable adaptive interpolation filter for video coding", Proc. ICIP2008, IEEE International Conference on Image Processing, pp. 2500-2503, San Diego, California, USA, Oct. 2008.
Shohei Matsuo, Seishi Takamura, and Hirohisa Jozawa, "Separable adaptive interpolation filter with region dividing technique for motion compensation", The Institute of Electronics, Information and Communication Engineers, Technical Committee on Image Engineering, pp. 113-116, Nov. 2009.
Shohei Matsuo, Yukihiro Bandoh, Seishi Takamura, and Hirohisa Jozawa: "Region-Based Adaptive Interpolation Filter", ITU-T SG16 WP3 and ISO/IEC JTC1/SC29/WG11 JCT-VC, JCTVC-B051, Jul. 2010.
International Search Report for PCT/JP2011/071342, ISA/JP, dated Dec. 27, 2011.
Office Action, Canadian Patent Application No. 2,811,376, dated Nov. 13, 2015.
Indian Office Action regarding INSN 2129/CHENP/2013, dated Jan. 11, 2019.

* cited by examiner

VIDEO ENCODING METHOD, VIDEO DECODING METHOD, VIDEO ENCODING APPARATUS, VIDEO DECODING APPARATUS, AND PROGRAMS THEREOF

CROSS-REFERENCE TO RELATED APPLICATIONS

This application is a 371 U.S. National Stage of International Application No. PCT/JP2011/071342, filed Sep. 20, 2011, which claims priority to Japanese Patent Application No. 2010-220560, filed Sep. 30, 2010, the contents of both of which are incorporated by reference herein.

TECHNICAL FIELD

The present invention relates to video encoding and video decoding technologies that achieve improvement in performance of an interpolation filter in video encoding using inter-frame prediction with motion compensation of fractional-accuracy and improvement in coding efficiency.

BACKGROUND ART

In video encoding, in the case of inter-frame prediction (motion compensation) encoding which performs prediction between different frames, a motion vector is obtained by referring to an already decoded frame so as to minimize the prediction error energy and the like, a residual signal is subjected to orthogonal transform, quantization is applied, and entropy encoding is performed, and binary data is obtained thereby. In order to increase the coding efficiency, it is indispensable to reduce the prediction error energy, and a prediction scheme that provides higher prediction accuracy is required.

A great number of tools that increase the accuracy of inter-frame prediction have been introduced into video encoding standards. For example, if there is occlusion in a nearest frame, the prediction error energy can be further reduced by referring to a frame that is distant in the time domain to some extent, and thus, in H.264/AVC, a plurality of frames can be referred to. This tool is called multiple reference frame prediction.

In addition, in order to deal with motions having complex shapes, a block size can be subdivided, such as 16×8, 8×16, 8×4, 4×8, and 4×4, in addition to 16×16 and 8×8. This tool is called variable block size prediction.

Similar to these, pixels of ½ accuracy are interpolated from integer-accuracy pixels of a reference frame using a 6-tap filter, and then pixels of ¼ accuracy are generated by linear interpolation using these pixels. Accordingly, it becomes possible to realize accurate prediction for motions of fractional accuracy. This tool is called ¼ pixel accuracy prediction. In this Description, "fractional accuracy" refers to arranging a motion vector on a fractional-pixel basis having higher accuracy than that of an integer multiple of a pixel spacing or arranging a motion vector at an integer multiple position. For example, the position obtained by dividing each pixel spacing into two exact halves is called ½ accuracy, and the positions obtained by dividing each pixel spacing into three equal parts are called ⅓ accuracy.

In order to develop next-generation video coding standards that provide higher coding efficiency than that of the H.264/AVC, various proposals are now being gathered from all over the world by the international organization for standardization ISO/IEC "MPEG" (International Organization for Standardization/International Electrotechnical Commission "Moving Picture Experts Group") and ITU-T "VCEG" (International Telecommunication Union-Telecommunication Standardization Sector "Video Coding Experts Group"). Among them, in particular, many proposals relating to inter-frame prediction (motion compensation) have been presented, and software for the next-generation video coding that is being drawn up under the leadership of the VCEG (hereinafter referred to as KTA (Key Technical Area) software) employs a tool for reducing the bit-rates of motion vectors, a tool for extending the block size to 16×16 or larger, and the like.

In particular, a tool for adaptively changing interpolation filter coefficients for a fractional-accuracy pixel is called an adaptive interpolation filter, it is effective for almost all the pictures, and it was first adopted in the KTA software. This technology is also employed in a lot of contributions to a call for proposal of a next-generation video coding test model issued by the group JCT-VC (Joint Collaborative Team on Video Coding), which is being jointly promoted by the MPEG and the VCEG for development of next-generation video coding standards.

Moreover, in addition to the adaptive interpolation filter, a method for improving a fixed interpolation filter is also proposed in which a plurality of sets of fixed interpolation filter coefficients are prepared, an optimum set is selected therefrom, and interpolation is performed, and they are introduced into a test model under consideration TMuC of the JCT-VC. Since the above-described methods for improving the interpolation filter highly contribute to an improvement in coding efficiency, it is one of very expectative fields, along with an in-loop filter and block size extension (a method using a size of 16×16, which is a conventional size, or larger, such as 32×32 and 64×64) that similarly provide a high degree of effectiveness.

[Fixed Interpolation]

In the H.264/AVC, as shown in FIG. 14, when the position of a ½ pixel is interpolated, interpolation is performed using 6 integer pixels including three points on the left side of the pixel to be interpolated and three points on the right side of the pixel to be interpolated. With respect to the vertical direction, interpolation is performed using 6 integer pixels including three points on the upper side and three points on the lower side. The filter coefficients are [(1, −5, 20, 20, −5, 1)/32]. After the positions of ½ pixels have been interpolated, the positions of ¼ pixels are interpolated using a mean filter of [½, ½]. Since it is necessary to interpolate the positions of all the ½ pixels, the computational complexity is high, but high-performance interpolation is possible, so that the coding efficiency is improved. Non-Patent Document 1 and Non-Patent Document 2 disclose the details of the above fixed interpolation filter.

In order to improve the performance of an interpolation filter of the H.264/AVC, a technology in which a plurality of sets of fixed interpolation filter coefficients are prepared and the interpolation filter coefficients are flexibly switched for each frame has been proposed. This scheme is called a switched interpolation filter with offset (hereinafter referred to as SIFO), and it is a technology of improving the coding efficiency by separately calculating an offset for adjusting a luminance signal and transmitting the offset in addition to an interpolation filter. As an improvement of this mechanism, in order to reduce the computational cost for switching the interpolation filter, a technology of executing, in a single pass, a determination of an interpolation filter used in the current frame using information on past frames that have been encoded has also been proposed. The above matters are disclosed in Non-Patent Document 3 and Non-Patent Document 4.

[Adaptive Interpolation]

In the H.264/AVC, the values of filter coefficients are constant, irrespective of conditions of an input picture (the type of a sequence, the size of a picture, and a frame rate) and encoding conditions (the block size, the structure of a GOP (group of pictures), and QP (quantization parameters)). When the values of filter coefficients are fixed, for example, effects that vary over time, such as aliasing, a quantization error, an error resulting from motion estimation, and camera noise, are not taken into consideration. Therefore, it is considered that improvement in performance is limited in terms of the coding efficiency. Accordingly, Non-Patent Document 5 proposes a scheme of adaptively changing interpolation filter coefficients, which is called a non-separable adaptive interpolation filter.

In Non-Patent Document 5, a two-dimensional interpolation filter (6×6=36 filter coefficients) is intended, and the filter coefficients are determined so as to minimize the prediction error energy. Although it is possible to realize higher coding efficiency than that obtained by using a one-dimensional 6-tap fixed interpolation filter employed in the H.264/AVC, the computational complexity for obtaining filter coefficients is very high, and thus Non-Patent Document 6 introduces a proposal for reducing the computational complexity.

The technique introduced in the Non-Patent Document 6 is called a separable adaptive interpolation filter (SAIF), and it uses a one-dimensional 6-tap interpolation filter rather than a two-dimensional interpolation filter.

FIG. 15A to FIG. 15C are diagrams illustrating a method for interpolating a pixel of non-integer accuracy in the separable adaptive interpolation filter (SAIF). Its procedure is such that, first, as shown by step 1 in FIG. 15B, pixels in the horizontal direction (a, b, and c) are interpolated. Integer-accuracy pixels C1 to C6 are used for determining filter coefficients. Filter coefficients in the horizontal direction that minimize a prediction error energy function $E_x^2$ of Equation (1) are analytically determined by the commonly known least square method (see Non-Patent Document 5).

[Equation 1]

$$E_x^2 = \sum_{x,y} \left( S_{x,y} - \sum_{c_i} w_{c_i} \cdot P_{\tilde{x}+c_i, \tilde{y}} \right)^2 \quad (1)$$

Here, S denotes an original picture, P denotes a decoded reference picture, x and y respective denote positions in the horizontal and the vertical direction in a picture. Moreover, ~x (~ is a symbol placed above x; the others are also the same) satisfies ~x=x+MV$_x$−FilterOffset, where MV$_x$ denotes the horizontal component of a motion vector that has been obtained beforehand, and FilterOffset denotes an offset for adjustment (the value obtained by dividing a filter length in the horizontal direction by 2). With respect to the vertical direction, ~y=y+MV$_y$ is satisfied, where MV$_y$ denotes the vertical component of the motion vector. $w_{c_i}$ denotes a group of filter coefficients in the horizontal direction $c_i$ (0≤$c_i$<6) that is to be determined.

Linear equations, the number of which being equal to the number of filter coefficients determined by Equation (1), are obtained, and minimizing processes are performed for fractional pixel positions in the horizontal direction independently of one another. Through the minimizing processes, three groups of 6-tap filter coefficients are obtained, and fractional-accuracy pixels a, b, and c are interpolated using these filter coefficients.

After the interpolation of the pixels in the horizontal direction has been completed, as shown by step 2 in FIG. 15C, an interpolation process in the vertical direction is performed. Filter coefficients in the vertical direction are determined by solving the linear problem similar to that in the horizontal direction. Specifically, filter coefficients in the vertical direction that minimize a prediction error energy function $E_y^2$ of Equation (2) are analytically determined.

[Equation 2]

$$E_y^2 = \sum_{x,y} \left( S_{x,y} - \sum_{c_j} w_{c_j} \cdot \hat{P}_{\tilde{x}, \tilde{y}+c_j} \right)^2 \quad (2)$$

Here, S denotes an original picture, ^P (^ is a symbol placed above P) denotes a picture which has been decoded and then interpolated in the horizontal direction, and x and y respectively denote positions in the horizontal direction and the vertical direction in a picture. Moreover, ~x is represented as 4·(x+MV$_x$), where MV$_x$ denotes the horizontal component of a motion vector that has been rounded off to the nearest whole number. With respect to the vertical direction, ~y is represented as y+MV$_y$−FilterOffset, where MV$_y$ denotes the vertical component of the motion vector, and FilterOffset denotes an offset for adjustment (the value obtained by dividing a filter length by 2). $w_{c_j}$ denotes a group of filter coefficients in the vertical direction $c_j$ (0≤$c_j$<6) that is to be determined.

Minimizing processes are performed for fractional-accuracy pixels independently of one another, and 12 groups of 6-tap filter coefficients are obtained. The remaining fractional-accuracy pixels are interpolated using these filter coefficients.

As stated above, it is necessary to encode 90 (=6×15) filter coefficients and transmit them to a decoder. In particular, since the overhead becomes large in low resolution encoding, filter coefficients to be transmitted are reduced using the symmetry of a filter. For example, as shown in FIG. 15A, b, h, i, j, and k are positioned at the centers with respect to interpolation directions, and with respect to the horizontal direction, coefficients obtained by inverting coefficients used for three points on the left side can be applied to three points on the right side. Similarly, with respect to the vertical direction, coefficients obtained by inverting coefficients used for three points on the upper side can be applied to three points on the lower side ($c_1$=$c_6$, $c_2$=$c_5$, and $c_3$=$c_4$).

Additionally, since the relationship between d and 1 is symmetric about h, inverted filter coefficients can be used. That is, by transmitting 6 coefficients for d, their values can also be applied to 1. $c(d)_1$=$c(1)_6$, $c(d)_2$=$c(1)_5$, $c(d)_3$=$c(1)_4$, $c(d)_4$=$c(1)_3$, $c(d)_5$=$c(1)_2$, and $c(d)_6$=$c(1)_1$ are satisfied. This symmetry is also used for e and m, f and n, and g and o. Although the same theory holds for a and c, since the result for the horizontal direction interpolation affects interpolation in the vertical direction, a and c are transmitted separately without using symmetry. With the use of the symmetry described above, the number of filter coefficients to be transmitted for each frame becomes 51 (15 for the horizontal direction and 36 for the vertical direction).

In the above adaptive interpolation filter of Non-Patent Document 6, the processing unit of the minimization of the prediction error energy is fixed to a frame. 51 filter coefficients are determined per one frame. If an encoding target frame is roughly divided into two types (or a plurality of types) of texture regions, the optimum filter coefficients are a group of coefficients in which both of them (all the textures) are taken into consideration. Under the situation in which characteristic filter coefficients are essentially obtained only in the vertical direction with respect to a region A and filter coefficients are obtained only in the horizontal direction with respect to a region B, filter coefficients are derived as the average of both of them.

Non-Patent Document 7 and Non-Patent Document 8 propose a method for achieving a reduction in prediction error energy and realizing improvement in coding efficiency by preparing a plurality of groups of filter coefficients and performing switching therebetween in accordance with local properties of a picture, without being limited to one group of filter coefficients (51 coefficients) per one frame.

As shown in FIG. 16A and FIG. 16B, it is assumed the case in which an encoding target frame includes textures having different properties. As shown in FIG. 16A, when one group of the optimized filter coefficients are transmitted for the entire frame, the properties of all the textures are taken into consideration. If the textures are not very much different from one another, it is considered that the filter coefficients obtained by optimizing its entirety are best; however, if the textures have properties that are opposite to one another, it is possible to further reduce the bit-rates of the entire frame by using filter coefficients that have been optimized for each texture as shown in FIG. 16B.

As a technique of division into regions, Non-Patent Document 7 and Non-Patent Document 8 employ a motion vector (the horizontal component, the vertical component, and the direction), spatial coordinates (the position of a macroblock, and the x coordinate and the y coordinate of a block), and the like, and performs the division into regions taking various properties of a picture into consideration.

Although the above matter is based on adaptive interpolation filters, it is not limited to the adaptive interpolation filters, and, when the property of a picture varies in a frame, the same discussion can even be applied to the case in which selection from fixed interpolation filter coefficients is performed as disclosed in Non-Patent Document 3 and Non-Patent Document 4. That is, it is possible to improve the coding efficiency as compared to the case in which one type of fixed interpolation filter is applied to the entire frame, provided that a fixed interpolation filter suitable for a region can be selected.

PRIOR ART DOCUMENTS

Non-Patent Documents

Non-Patent Document 1: Sakae Okubo, Shinya Kadono, Yoshihiro Kikuchi, and Teruhiko Suzuki, "H.264/AVC Textbook: 3rd Revised Edition", Impress R&D, pp. 119-123, 2009

Non-Patent Document 2: I. E. G. Richardson and G J. Sullivan: "H.264 and MPEG-4 VIDEO COMPRESSION", WILEY, pp. 172-175, 2003

Non-Patent Document 3: Marta Karczewicz, Yan Ye, and Peisong Chen: "Switched Interpolation Filter with Offset", ITU-T SG16 Q.6 VCEG, VCEG-AI35, Berlin, Germany, July 2008

Non-Patent Document 4: Marta Karczewicz, Yan Ye, Peisong Chen, and Giovanni Motta: "Single Pass Encoding using Switched Interpolation Filters with Offset", ITU-T SG16 Q.6 VCEG, VCEG-AJ29, San Diego, Calif., USA, October 2008

Non-Patent Document 5: Y. Vatis, B. Edler, D. T. Nguyen, and J. Ostermann: "Motion- and aliasing-compensated prediction using a two-dimensional non-separable adaptive Wiener interpolation filter", Proc. ICIP2005, IEEE International Conference on Image Processing, pp. II 894-897, Genova, Italy, September 2005

Non-Patent Document 6: S. Wittmann and T. Wedi: "Separable adaptive interpolation filter for video coding", Proc. ICIP2008, IEEE International Conference on Image Processing, pp. 2500-2503, San Diego, Calif., USA, October 2008

Non-Patent Document 7: Shohei Matsuo, Seishi Takamura, and Hirohisa Jozawa, "Separable adaptive interpolation filter with region dividing technique for motion compensation", The Institute of Electronics, Information and Communication Engineers, Technical Committee on Image Engineering, pp. 113-116, November 2009

Non-Patent Document 8: Shohei Matsuo, Yukihiro Bandoh, Seishi Takamura, and Hirohisa Jozawa: "Region-Based Adaptive Interpolation Filter", ITU-T SG16 WP3 and ISO/IEC JTC1/SC29/WG11 JCT-VC, JCTVC-B051, July 2010

SUMMARY OF INVENTION

Problems to be Solved by the Invention

The region-dividing type adaptive interpolation filters disclosed in Non-Patent Document 7 and Non-Patent Document 8 switch a plurality of groups of filter coefficients within a frame in consideration of local properties of a picture, thereby reducing the prediction error energy and realizing improvement in coding efficiency.

Although Non-Patent Document 7 and Non-Patent Document 8 focus on motion vectors and spatial coordinates when division into regions is performed, texture information of a residual signal are not taken into consideration. Moreover, the division into regions based on the motion vectors and the spatial coordinates does not completely realize division into regions in accordance with the property of a picture. For example, when spatial division is performed, Non-Patent Document 8 performs division into two exact halves, division into three equal parts, or division into quarters with respect to the horizontal direction (similar division is performed with respect to the vertical direction) or simultaneously performs division into two exact halves with respect to the horizontal direction and division into two exact halves with respect to the vertical direction, but the ranges of the regions are fixed. Similarly, in division using motion vectors, since a motion vector is switched on a block-by-block basis, even when a plurality of blocks are included in the same texture region, there is a possibility that these blocks are classified into different regions when their motions are different from one another. It is considered that further improvement in coding efficiency can be anticipated by updating region information based on the result of division into regions so that these regions are close to regions based on which the property varies in an actual picture.

Moreover, even if the ideas of Non-Patent Document 7 and Non-Patent Document 8 are applied to the case in which fixed interpolation filter coefficients and an offset are switched for each region as disclosed in Non-Patent Document 3 and Non-Patent Document 4, bit-rates for filter indices are generated for each divided region, and thus it is impossible to reduce the bit-rates.

In view of this point, an object of the present invention is to further improve the coding efficiency by reducing residual energy of inter-frame prediction with motion compensation as compared to the conventional arts; more specifically, to realize improvement in coding efficiency for a picture in which motion vectors and textures varies significantly within a frame.

Means for Solving the Problems

As a method for achieving the above object, the energy of a residual signal is calculated based on an assumption that information included in the residual signal reflects texture information of an original picture, and division into regions (also called classification into regions) is performed. Moreover, a process of adjusting the ranges in division into regions (in the present invention, this is called a divided region redefinition process) is executed on the result of the division into regions that has been obtained based on particular encoding information, and division that provides the best distortion cost is selected, thereby realizing a reduction in prediction error energy and improving the coding efficiency. Furthermore, allocation of codewords to filter indices is changed using information on encoded frames, thereby realizing a reduction in overhead.

An outline of a video encoding process in accordance with the present invention is as follows.

(1) Division (classification) into a plurality of regions, each of which including similar properties, is performed for each block of motion compensation based on encoding information such as motion vectors and texture (edge) information. That is, a divided region number is determined for each block.

(2) A divided region redefinition process is applied to divided region information obtained in the above process (1). Here, the divided region redefinition process is a process which inputs divided region information obtained from, for example, encoding information, shifts a region dividing line in the horizontal direction or the vertical direction, calculates a block density of blocks having a particular divided region number for the position of each region dividing line, determines whether or not the block density exceeds a threshold value, determines the position of the optimum region dividing line, and updates and outputs divided region information.

(3) A set of interpolation filter coefficients that is optimum for each of regions divided in accordance with the updated divided region information is selected. At this time, a set of interpolation filter coefficients that is best from the viewpoint of a rate distortion cost is generated or selected.

(4) An interpolation filter in accordance with the set of interpolation filter coefficients obtained by the above process (3) is applied to each divided region.

(5) Interpolation filter coefficients or filter index information that is required for each divided region is encoded.

(6) All the other pieces of information such as DCT (Discrete Cosine Transform) coefficients are encoded.

An outline of a video decoding process in accordance with the present invention is as follows.

(1) Interpolation filter coefficients or a filter index is decoded.

(2) Encoding information such as a motion vector is decoded for each block.

(3) Divided region information is determined based on the encoding information.

(4) The same process as that of the divided region redefinition process in an encoder is performed based on the encoding information obtained in above (2) and the divided region information obtained in above (3).

(5) Interpolation is performed on a picture based on an obtained set of interpolation filter coefficients, and a reference picture is restored.

(6) Motion compensation is performed using the reference picture obtained in above (5), and a decoded picture is obtained.

The operation of the present invention is as follows. An adaptive interpolation filter using the conventional region-dividing method employs a region-dividing technique that uses motion vectors and spatial coordinates, so that it is impossible to perform division into regions using information on a residual signal and locality in a picture is not taken into consideration sufficiently. Moreover, it is impossible to change the ranges of the divided regions once they have been determined. Furthermore, a mechanism of adaptively changing allocation of bit-rates based on statistical information of encoded frames to reduce overhead does not exist.

In contrast, the present invention can realize division into regions in accordance with features of a residual signal and adjust the ranges of the divided regions based on encoding information, so that the coding efficiency can be improved. Moreover, with a process of selecting the optimum set of coefficients from among a plurality of sets of fixed interpolation filter coefficients for each divided region, rather than adaptively deriving interpolation filter coefficients, overhead relating to filter indices can also be reduced. In particular, in addition to an interpolation filter, an offset component of at least one of a luminance signal and a chrominance signal used in an interpolation process is calculated for each divided region, the obtained offset is applied to each divided region and encoding is performed thereon, and the obtained offset information is encoded, thereby further improvement in coding efficiency can be achieved. Furthermore, information on encoded frames are collected, the occurrence probability of an index for the set of fixed interpolation filter coefficients is calculated, a codeword is selected and allocated based on the obtained probability when the index is encoded, and thereby an increase in header information can be prevented.

In particular, the most distinctive feature of the present invention is that, in consideration of the fact that when division into regions is performed based on merely encoding information such as motion vectors and texture (edge)) information in a picture, the granularity of the division becomes a block used for prediction and does not always match an actual motion and a texture, a divided region redefinition process is applied based on divided region information obtained from the encoding information, so that regions based on which filter coefficients are switched can be adjusted, and it is possible to more flexibly deal with the locality in a picture.

Advantageous Effects of the Invention

The present invention can realize division into regions using information on the energy of a residual signal when the division into regions is performed and an interpolation filter is applied to each region, provide a wide variety of types of division into regions, and increase the flexibility in terms of locality in a picture. Moreover, the ranges of divided regions that are divided in accordance with a region classification using encoding information can be adjusted, a wide variety of types of ranges of the regions based on which filters are switched can be provided, and the flexibility in terms of locality in a picture can be improved. Furthermore, a mechanism of reducing overhead is introduced. With the above factors, the present invention can improve the coding efficiency.

MODES FOR CARRYING OUT THE INVENTION

Hereinafter, embodiments of the present invention will be described with reference to the drawings.
[Video Encoding Apparatus]

Figure 1:
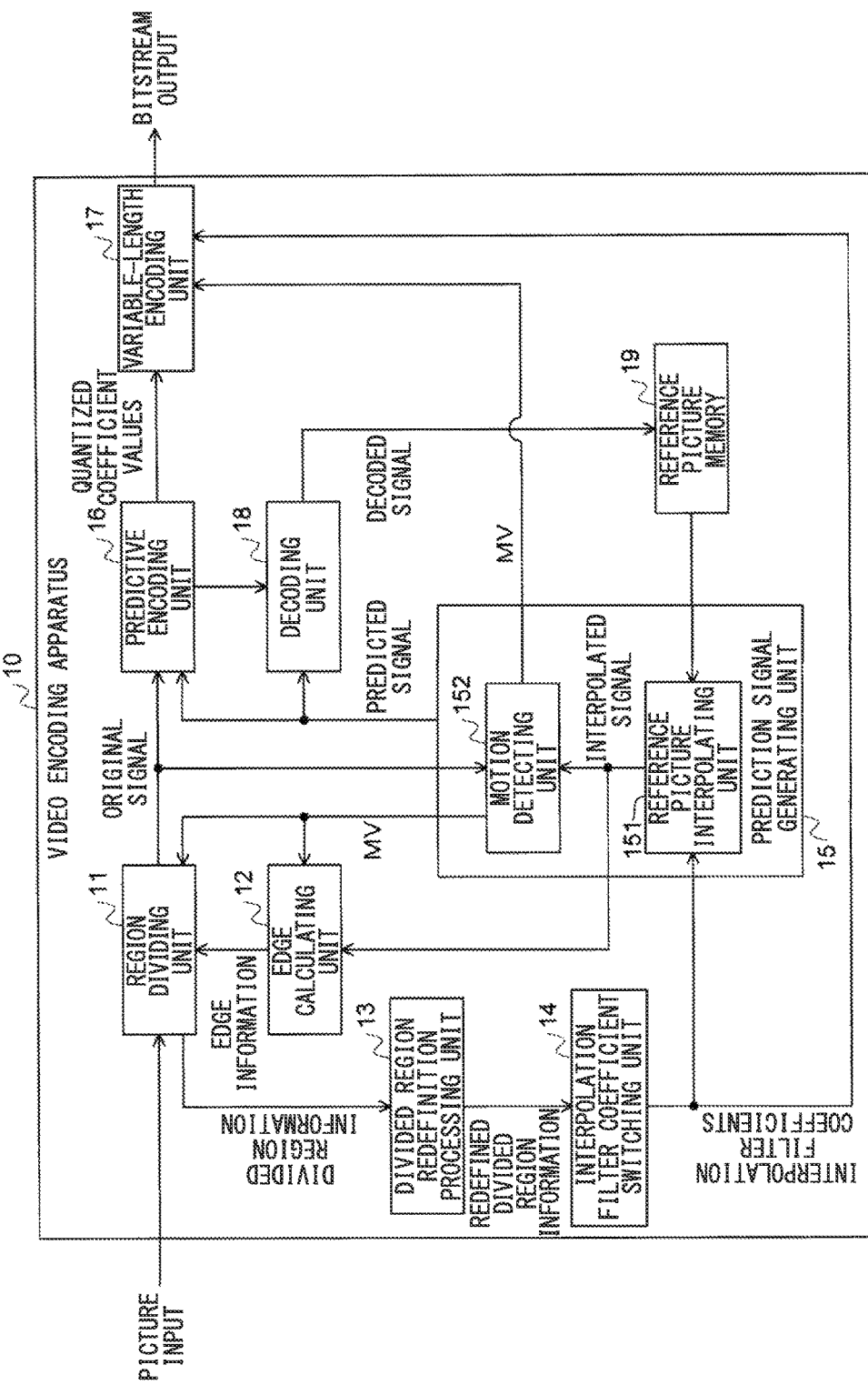
FIG. 1 is a diagram illustrating an example of a configuration of a video encoding apparatus.

FIG. 1 is a diagram illustrating an example of a configuration of a video encoding apparatus in accordance with the present invention. A video encoding apparatus 10 is an apparatus which interpolates fractional-accuracy pixels using a region-dividing type interpolation filter that utilizes motion vectors and texture information of a picture such as an edge and performs encoding with motion compensation of fractional-accuracy, and which is provided with a mechanism that redefines division into regions that serve as units for switching interpolation filters after performing provisional division (grouping) based on classification into the regions, thereby enabling efficient switching of the interpolation filters.

In the video encoding apparatus 10, in order to divide an encoding target frame of an input video signal into a plurality of regions which include a plurality of blocks serving as units for adaptively switching interpolation filter coefficients using edge information calculated by an edge calculating unit 12, a region dividing unit 11 classifies the blocks into the regions, each of which including similar features of a picture, using the edge information obtained from the edge calculating unit 12, and then outputs divided region information that indicates the classification. The edge calculating unit 12 extracts the edge information from a reference picture when motion compensation is performed. It is to be noted that although the details thereof will be described later, other pieces of encoding information such as a motion vector may be extracted and used.

In order to redefine the divided region information output from the region dividing unit 11, a divided region redefinition processing unit 13 shifts region dividing lines in either one or both of the horizontal direction and the vertical direction and selects a region dividing line with which the density of blocks having a particular divided region number becomes greater than or equal to a predetermined threshold value, thereby adjusting the division into regions provisionally divided by the region dividing unit 11 and redefining the division into regions that serve as units for actually switching the interpolation filter coefficients.

An interpolation filter coefficient switching unit 14 switches interpolation filter coefficients for a fractional-accuracy pixel which are used for a reference picture in predictive encoding for each of the regions redivided by the divided region redefinition processing unit 13. As the interpolation filter coefficients to be switched, interpolation filter coefficients that minimize square error energy or interpolation filter coefficients that minimize a rate distortion cost in encoding a prediction error between an original picture and an interpolated reference picture are selected and used for each of the regions.

A prediction signal generating unit 15 is provided with a reference picture interpolating unit 151 and a motion detecting unit 152. The reference picture interpolating unit 151 applies an interpolation filter using interpolation filter coefficients selected by the interpolation filter coefficient switching unit 14 to a decoded reference picture stored in a reference picture memory 19. The motion detecting unit 152 performs a motion search on the interpolated reference picture to calculate a motion vector MV. The prediction signal generating unit 15 performs motion compensation using the motion vector of fractional-accuracy calculated by the motion detecting unit 152 to generate a predicted signal.

A predictive encoding unit 16 performs predictive encoding by, for example, calculating a residual signal between the input video signal and the predicted signal, performing orthogonal transform thereon, and quantizing transform coefficients. In addition, a decoding unit 18 performs decoding on the result of the predictive encoding and stores a decoded signal in the reference picture memory 19 for the subsequent predictive encoding.

A variable-length encoding unit 17 performs variable-length encoding on the quantized transform coefficients and the motion vector, encodes information on the division into regions, and outputs them as an encoded bitstream.

Figure 2:
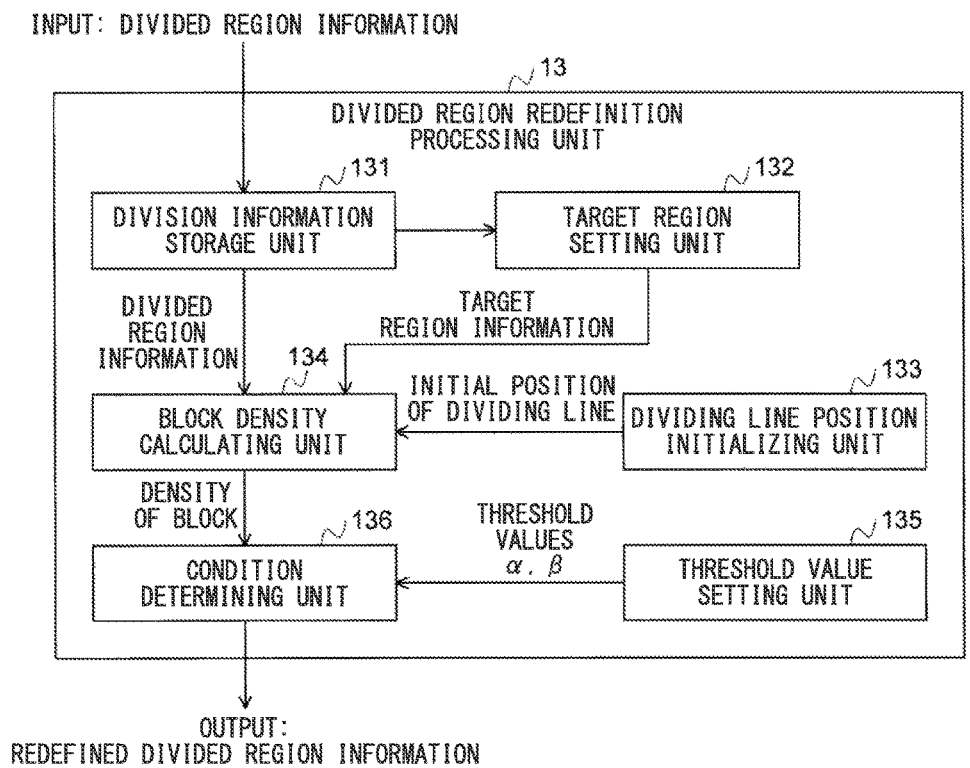
FIG. 2 is a diagram illustrating an example of a configuration of a divided region redefinition processing unit.

FIG. 2 illustrates an example of a configuration of the divided region redefinition processing unit 13 in the video encoding apparatus 10. In the divided region redefinition processing unit 13, a division information storage unit 131 stores input divided region information. This divided region information is, for example, a divided region number assigned to a block. This divided region number is region classification information which indicates a region to which each block belongs. A target region setting unit 132 sets a divided region number corresponding to a region that is to be processed. A dividing line position initializing unit 133 sets an initial position of either one or both of a region dividing line in the horizontal direction and a region dividing line in the vertical direction for divided region redefinition. A block density calculating unit 134 calculates the densities of blocks having the divided region number set by the target region setting unit 132 in regions divided by the region dividing line. A threshold value setting unit 135 sets threshold values $\alpha$ and $\beta$ used for determination of conditions of the block densities. A condition determining unit 136 determines whether or not a region divided by the region dividing line satisfies a predetermined condition based on the block densities calculated by the block density calculating unit 134 and the threshold values $\alpha$ and $\beta$ set by the threshold value setting unit 135. If the predetermined condition is not satisfied, the region dividing line is shifted, and calculation of block densities by the block density calculating unit 134 and a determination of conditions by the condition determining unit 136 are repeated in the same manner. It is to be noted that the details of these processes will be described later using flowcharts. Finally, information on divided regions divided by a region dividing line that satisfies the condition is output from the divided region redefinition processing unit 13, as redefined divided region information.

[Encoding Process (Example 1)]

Figure 3:
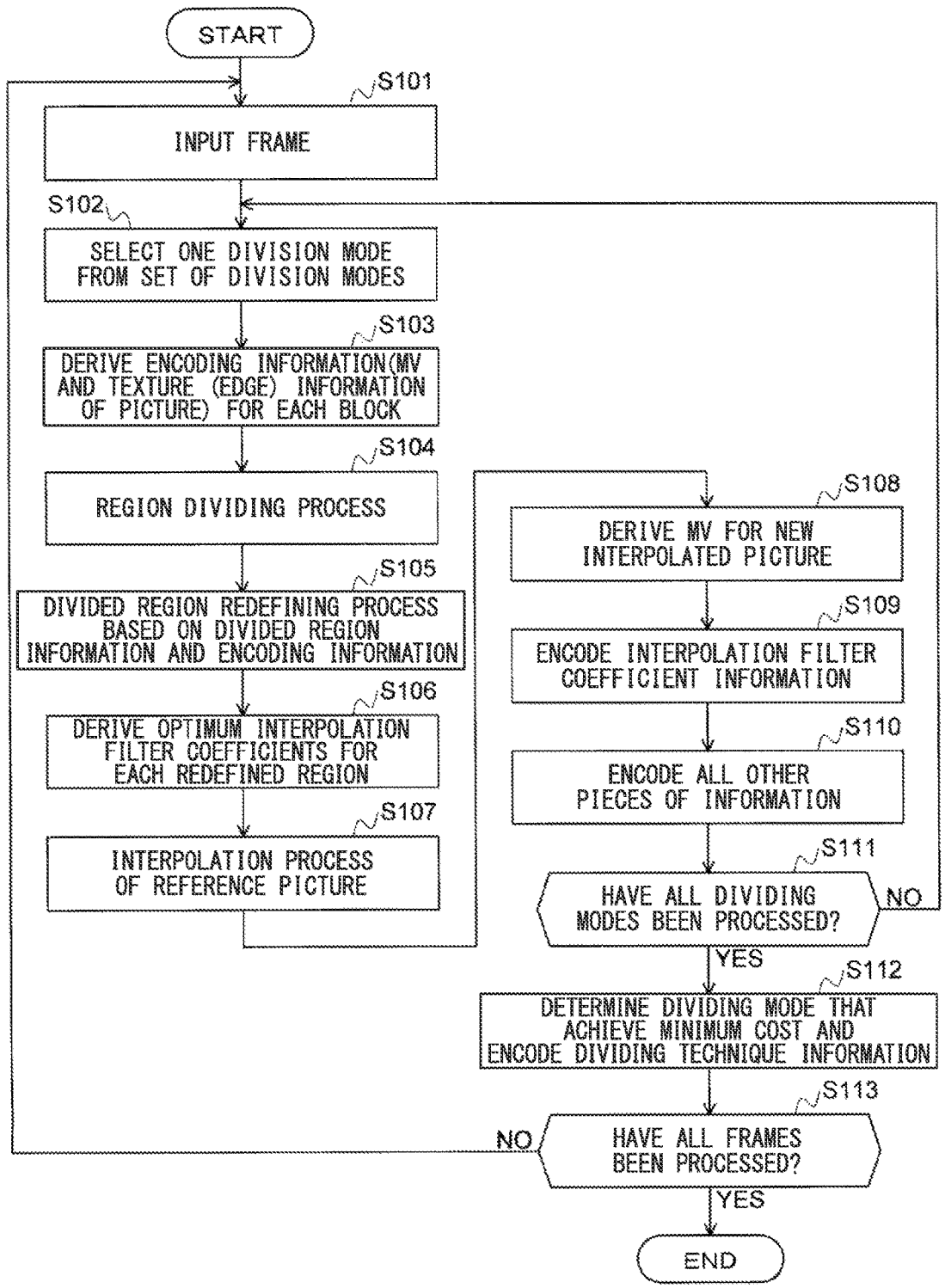
FIG. 3 is a flowchart of a video encoding process (example 1).

FIG. 3 is a flowchart of a video encoding process executed by the video encoding apparatus 10. Hereinafter, unless otherwise specified, a description will be given assuming that luminance signals are processed; however, the process can be applied not only to luminance signals but also to chrominance signals. In this example, after division into regions is performed, the ranges of the regions are corrected by a divided region redefinition process, the optimum interpolation filter is derived for each region, and encoding is performed.

First, in step S101, an encoding target frame is input.

Subsequently, in step S102, one of predefined division modes is selected. A division mode defines information based on which division (classification) into regions is performed, and all the pieces of encoding information such as a motion vector, spatial coordinates, and texture (edge) information can be used as information for performing the division into regions. As the division modes, various modes are predefined; for example, mode 1 in which division is performed based on the direction of a motion vector, mode 2 in which division is performed based on the length of a motion vector, mode 3 in which division is performed based on the size of the horizontal component of a motion vector, mode 4 in which division is performed based on the size of the vertical component of a motion vector, mode 5 in which division is performed based on the direction of an edge extracted from a reference picture, mode 6 in which division is performed based on the size of the horizontal component of an edge extracted from a reference picture, mode 7 in which division is performed based on the size of the vertical component of an edge extracted from a reference picture, and mode 8 in which division is performed based on the direction of an edge extracted from a prediction error picture. Dividing techniques corresponding to the division modes are not limited to the foregoing examples, techniques based on various pieces of information obtained from the encoding information can be used, and a mode obtained by combining a plurality of modes described above may be defined as an additional mode.

Subsequently, in step S103, the frame is divided into blocks, each block having, for example, a block size of m×n (m and n are positive integers) of motion prediction, and encoding information such as a motion vector and a texture (edge information) of a picture are derived for each block. For example, when the division mode is a mode in which a motion vector is used, the optimum motion vector is calculated. For interpolation of a fractional-accuracy pixel of a reference picture for calculating a motion vector in step S103, for example, a conventional fixed 6-tap filter in accordance with the H.264/AVC is used. Moreover, in order to omit a motion search process, a motion vector designated by a block of the same position as that of the previous frame may be used.

Subsequently, in step S104, a divided region number is assigned to the current block using the encoding information obtained in step S103, for example, one or a plurality of motion vectors. That is, division into regions is performed. At this time, for example, one motion vector is obtained when a P picture is encoded, and two motion vectors are obtained when a B picture is encoded.

In the case of a B picture, two types of region-dividing technique can be used. A first one is the case in which different filters are used for frames designated by the motion vectors, and a second one is the case in which one common filter is used for prediction vectors based on information on the two motion vectors. In the former case, k (k is any positive integer) types of numbers are assigned in accordance with directions designated by the two motion vectors. That is, a process similar to that for a P picture is repeated twice. In the latter case, when frame numbers (ref_idx) that are referred to are different from each other, for example, when a first vector designates a frame that is distant in the time domain (ref_idx≠0) and a second vector designates the closest frame in the time domain (ref_idx=0), it is conceivable to employ a process in which a higher priority is given to the closer one in the time domain, and the same interpolation filter is used.

Figure 4:
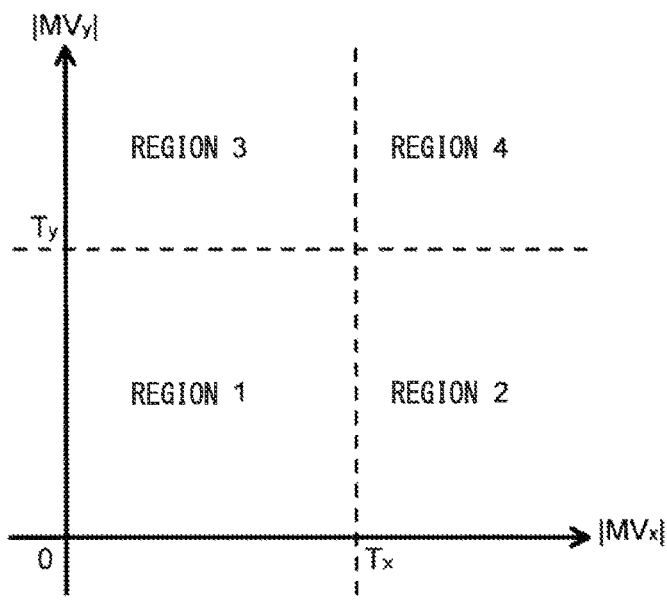
FIG. 4 is a diagram illustrating an example of division into regions.
Figure 5:
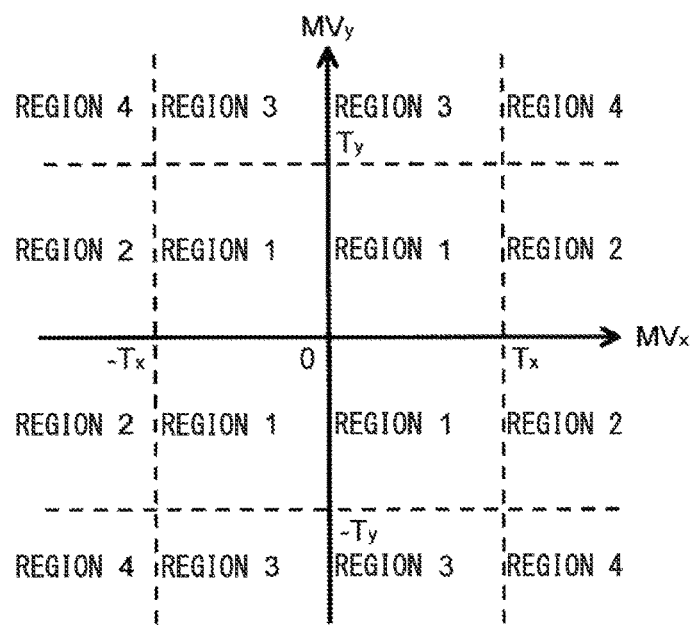
FIG. 5 is a diagram illustrating an example of division into regions.

As described above, depending on the division mode, not only the direction of a motion vector but also the length and components of a motion vector, and the like can be used for determining divided regions. FIG. 4 illustrates an example in which a frame is divided into four regions using the length (the absolute values of horizontal/vertical components) of a motion vector. Moreover, FIG. 5 illustrates an example in which a frame is divided into four regions using components themselves of a motion vector. FIG. 4 and FIG. 5 illustrate $T_x$ and $T_y$ as the threshold values, and they are separately encoded and transmitted as part of interpolation filter information in step S109 described later. As the threshold values, the same fixed value may be used for all the frames, or the threshold values may be adjusted for each frame so that the rates of the regions becomes the same (in the case in which the ratios between areas of region 1 to region 4 are almost the same) or a constant value. However, when the rates are variable on a frame-by-frame basis, it is necessary to encode the rates for each frame. Moreover, $T_x$ may be set so as to be different from $T_y$, or the same value may be set in $T_x$ and $T_y$ ($T_x=T_y$) in order to reduce overhead information. In this process, a frame is divided into a plurality of regions.

Subsequently, in step S105, the divided region redefinition processing unit 13 performs a divided region redefinition process based on the divided region information obtained in step S104. The details of the divided region redefinition process will be described later using FIG. 6.

Subsequently, in step S106, an interpolation filter is optimized for each region based on the result of the redefined division into regions of step S105. In the case of an adaptive interpolation filter, interpolation filter coefficients that minimize square error energy are calculated for each region.

Subsequently, in step S107, a reference picture is interpolated using the interpolation filter coefficients obtained in step S106.

Subsequently, in step S108, a motion vector is derived for the interpolated picture obtained in step S107.

Subsequently, in step S109, information on the interpolation obtained in step S106, that is, the interpolation filter coefficients are encoded. Moreover, information necessary for the interpolation, information on the threshold values required for the division into regions, and the like are all encoded in this step.

Subsequently, in step S110, the remaining pieces of information to be encoded (texture information, that is, quantization coefficient values, motion vectors, and the like) are all encoded.

Subsequently, in step S111, a check is made as to whether or not there is a division mode to be searched for other than the division mode selected in step S102. If there is a division mode to be searched for, the processing returns to step S102, and a similar process is repeated for the next division mode. If the processes for all the division modes to be searched for have been completed, the processing proceeds to step S112.

Subsequently, in step S112, a division mode that minimizes a rate distortion cost is determined based on the result of a loop configured by steps S102 to S111. This information is encoded and transmitted.

Subsequently, in step S113, a determination is made as to whether or not all the input picture frames have been encoded. If the encoding has not been completed, the processing returns to step S101 and proceeds to a process of the next frame. If all the frames have been encoded, the encoding process ends.

Figure 6:
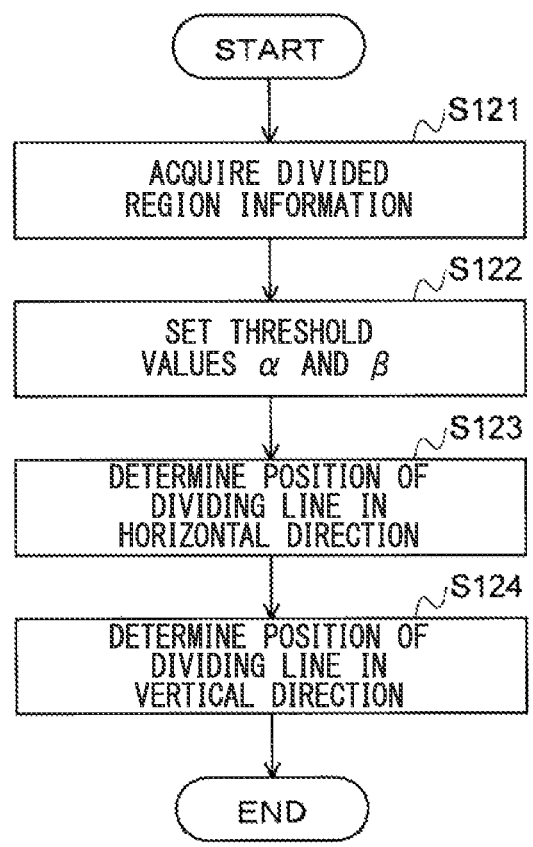
FIG. 6 is a flowchart of a divided region redefinition process.
Figure 7:
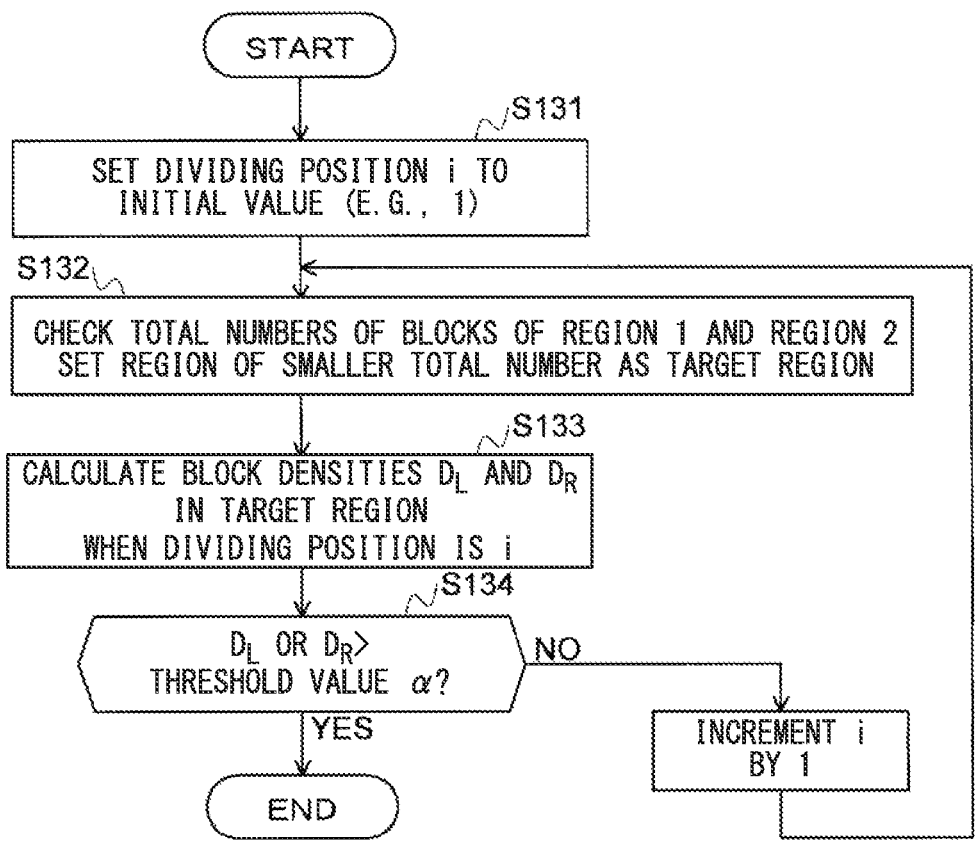
FIG. 7 is a flowchart of a dividing line position determination process.

FIG. 6 is a flowchart of the divided region redefinition process, and FIG. 7 is a flowchart of a dividing line position determination process in the divided region redefinition process. Hereinafter, the details of the divided region redefinition process in step S105 of FIG. 3 will be described using FIG. 6 and FIG. 7.

Figure 8:
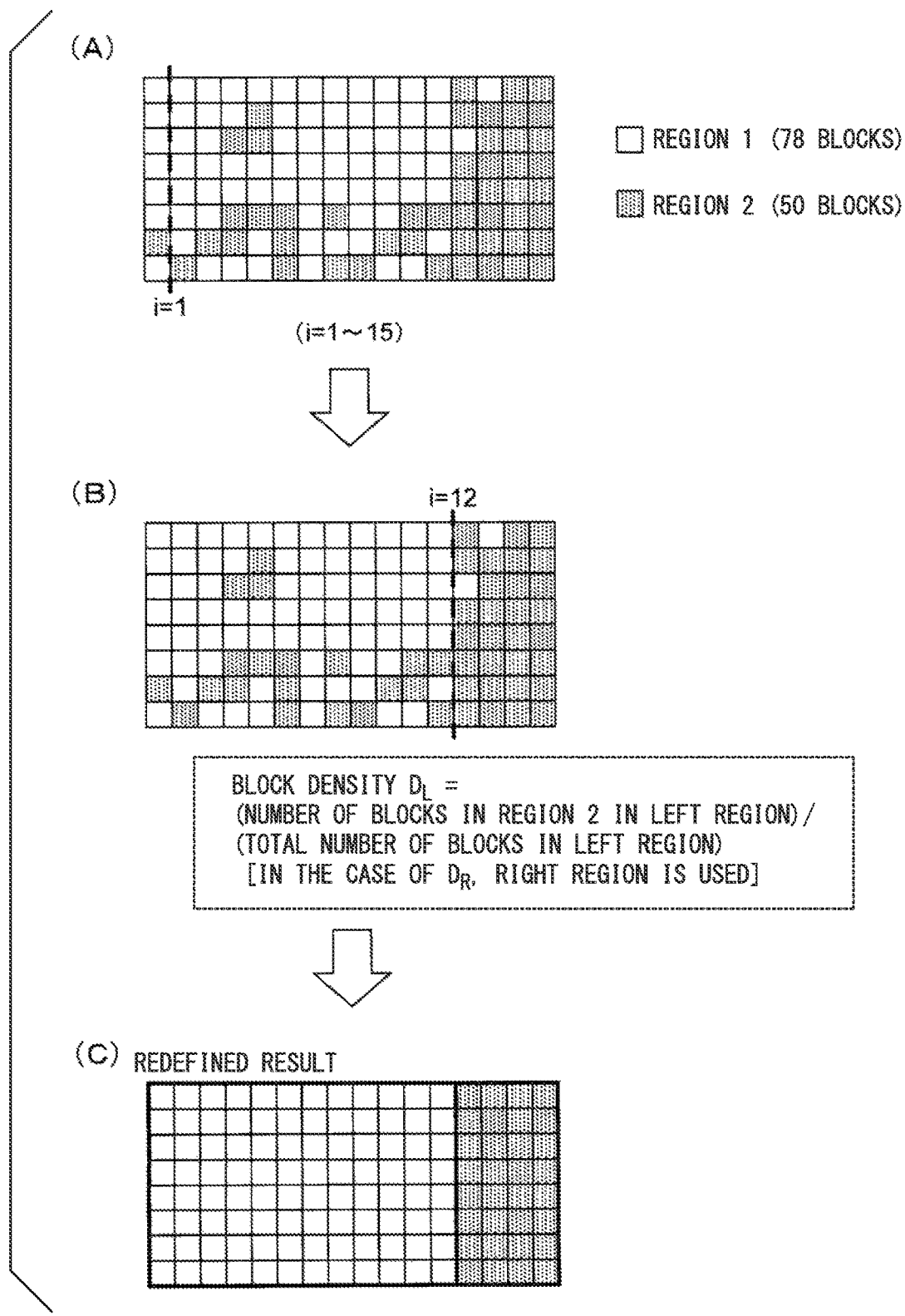
FIG. 8 is a diagram illustrating an example of the result of the divided region redefinition process.

In step S121, the divided region information obtained in step S104 is acquired. For example, it is assumed that the result in which an encoding target frame is divided into regions including region 1 and region 2 as shown in FIG. 8 (A) is obtained.

Subsequently, in step S122, the threshold values α and β, which are necessary to redefine the division, are set. α is a threshold value relating to a determination of a dividing line in the horizontal direction, and β is a threshold value relating to a determination of a dividing line in the vertical direction. These values may be determined experimentally, or a fixed value such as 0.9 may be used as these values.

Subsequently, in step S123, the position of the dividing line in the horizontal direction is determined based on the divided region information acquired in step S121 and the threshold value a set in step S122. The detailed flow will be described later with reference to FIG. 7.

Subsequently, in step S124, the position of the dividing line in the vertical direction is determined based on the divided region information acquired in step S121 and the threshold value β set in step S122. The detailed flow is similar to the process that will be described with reference to FIG. 7.

The determination of the position of the dividing line in step S123 is performed as shown in FIG. 7. First, in step S131, the position i of a dividing line is set to an initial position. In the case of determining the dividing line in the horizontal direction, as shown in FIG. 8 (A), a line including the leftmost blocks is set as the initial position and i is set to 1.

Subsequently, in step S132, when there are two types of divided regions, the total numbers of blocks are counted for region 1 and region 2. At this time, a region having a smaller total number of blocks is set as a target region. In the case of FIG. 8 (A), the number of blocks of region 1 is 78 and the number of blocks of region 2 is 50, and thus region 2 is set as the target region.

Subsequently, in step S133, a block density $D_L$ and a block density $D_R$ of each target region when the dividing position is i are calculated. $D_L$ denotes a block density of a region on the left of the region dividing line, and $D_R$ denotes a block density on a region on the right thereof. A definition of the block density $D_L$ is as follows.

Block density $D_L$=the number of target blocks in the left region/the total number of blocks included in the left region With respect to the block density $D_R$, in the foregoing equation, the right region is used instead of the left region.

FIG. 8 (B) illustrates an example when the region dividing line is shifted so that i is equal to 12; in this case, the block densities $D_L$ and $D_R$ are as follows.

$$D_L=20/96\approx0.208$$

$$D_R=30/32\approx0.938$$

Subsequently, in step S134, a determination is made as to whether the block densities calculated in step S133 exceed the threshold value. For example, in the case of the exemplary division into regions of FIG. 8, in which the threshold value α=0.9, the condition is satisfied when i=12, and thus the region dividing line is determined to be at this position. If the condition is not satisfied, i is incremented by 1, and the processing returns to step S132.

With the above processes, the redefined result of the regions in the horizontal direction is as shown in FIG. 8 (C). Also, with respect to the vertical direction, the region dividing line can be determined in accordance with a flow similar to that of the above processes. Moreover, with respect to the threshold values, the same value may be used for all the frames of the encoding target video, or a change in scene may be detected and the threshold values may be switched for each scene including a plurality of frames. When the threshold values are switched for each scene, it is necessary to encode information on the threshold values for each scene in step S109. Moreover, the threshold values may be switched for each frame. In this case, it is necessary to encode the threshold values for each frame.

[Encoding Process (Example 2)]

Figure 9:
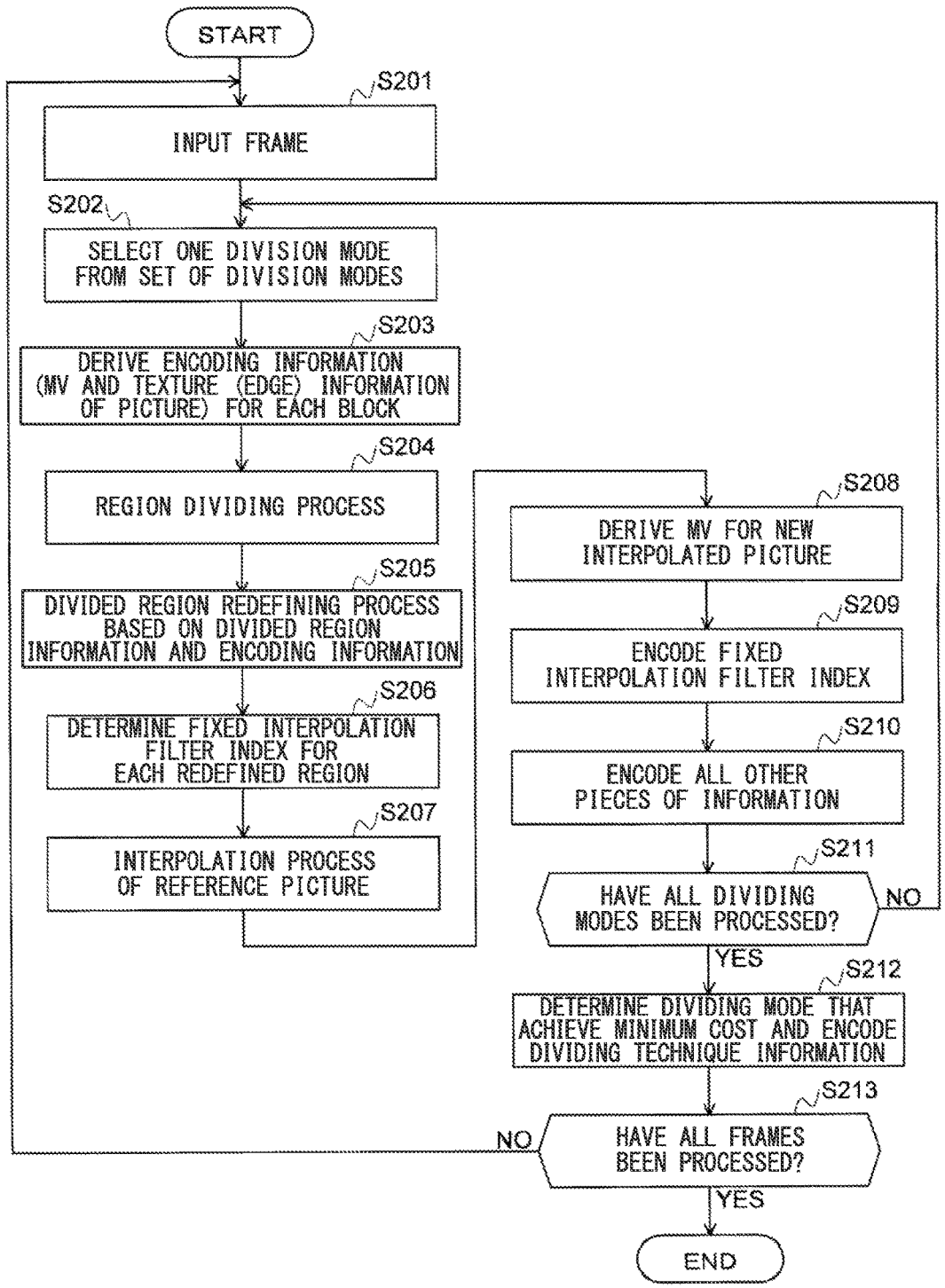
FIG. 9 is a flowchart of a video encoding process (example 2).

FIG. 9 illustrates a second example of a video encoding process executed by the video encoding apparatus 10. Hereinafter, unless otherwise specified, a description will be given assuming that luminance signals are processed; however, the process can be applied not only to luminance signals but also to chrominance signals. In this example, after division into regions is performed, the ranges of the regions are corrected by a divided region redefinition process, the optimum fixed interpolation filter is determined for each region, and encoding is performed.

First, in step S201, a frame of an encoding target picture is input.

Subsequently, in step S202, one of predefined division modes is selected. The division modes have been described in the encoding process (example 1).

Subsequently, in step S203, the frame is divided into blocks, each block having, for example, a block size of m×n (m and n are positive integers) of motion prediction, and the optimum motion vector is calculated for each block. In interpolation of a fractional-accuracy pixel of a reference picture in step S203, for example, a conventional fixed 6-tap filter in accordance with the H.264/AVC is used. Moreover, in order to omit a motion search process, a motion vector designated by a block at the same position as that of the previous frame may be used.

Subsequently, in step S204, a divided region number is assigned to the current block using one or a plurality of motion vectors obtained in step S203. Similar to step S104 of the encoding process (example 1), division into regions is performed using the encoding information (motion vectors, texture information, and the like).

Subsequently, in step S205, the divided region redefinition process is performed based on the divided region information obtained in step S204. The details of the divided region redefinition process are the processes described in detail using FIG. 6 and FIG. 7.

Subsequently, in step S206, an interpolation filter is optimized for each region based on the result of the redefined division into regions of step S205. For example, in the case of a fixed interpolation filter, a plurality of indices of fixed interpolation filters that have been prepared are sequentially tested, and rate distortion costs are calculated. By testing such a predefined filter set, the optimum filter index is acquired. In this step, for example, an existing filter determination method such as a cost function based on square error energy can be used.

Subsequently, in step S207, a reference picture is interpolated using the interpolation filter index obtained in step S206.

Subsequently, in step S208, a motion vector (MV) is derived for the interpolated picture obtained in step S207.

Subsequently, in step S209, the fixed interpolation filter index, which is information on the interpolation obtained in step S206, and information required for the division into regions are encoded. Information on the interpolation such as the threshold values is also encoded in this step.

Subsequently, in step S210, the remaining pieces of information to be encoded (texture information, that is, quantization coefficient values, motion vectors, and the like) are all encoded.

Subsequently, in step S211, a check is made as to whether or not there is a division mode to be searched for other than the division mode selected in step S202. If there is a division mode to be searched for, the processing returns to step S202, and if the processes for all the division modes to be searched for have been completed, the processing proceeds to step S212.

Subsequently, in step S212, a division mode that minimizes a rate distortion cost is determined based on the result of a loop configured by steps S202 to S211. This information is encoded and transmitted.

Subsequently, in step S213, a determination is made as to whether or not all the input picture frames have been encoded. If the encoding has not been completed, the processing returns to step S201 and proceeds to a process of the next frame. If all the frames have been encoded, the encoding process ends.

[Encoding Process (Example 3)]

Figure 10:
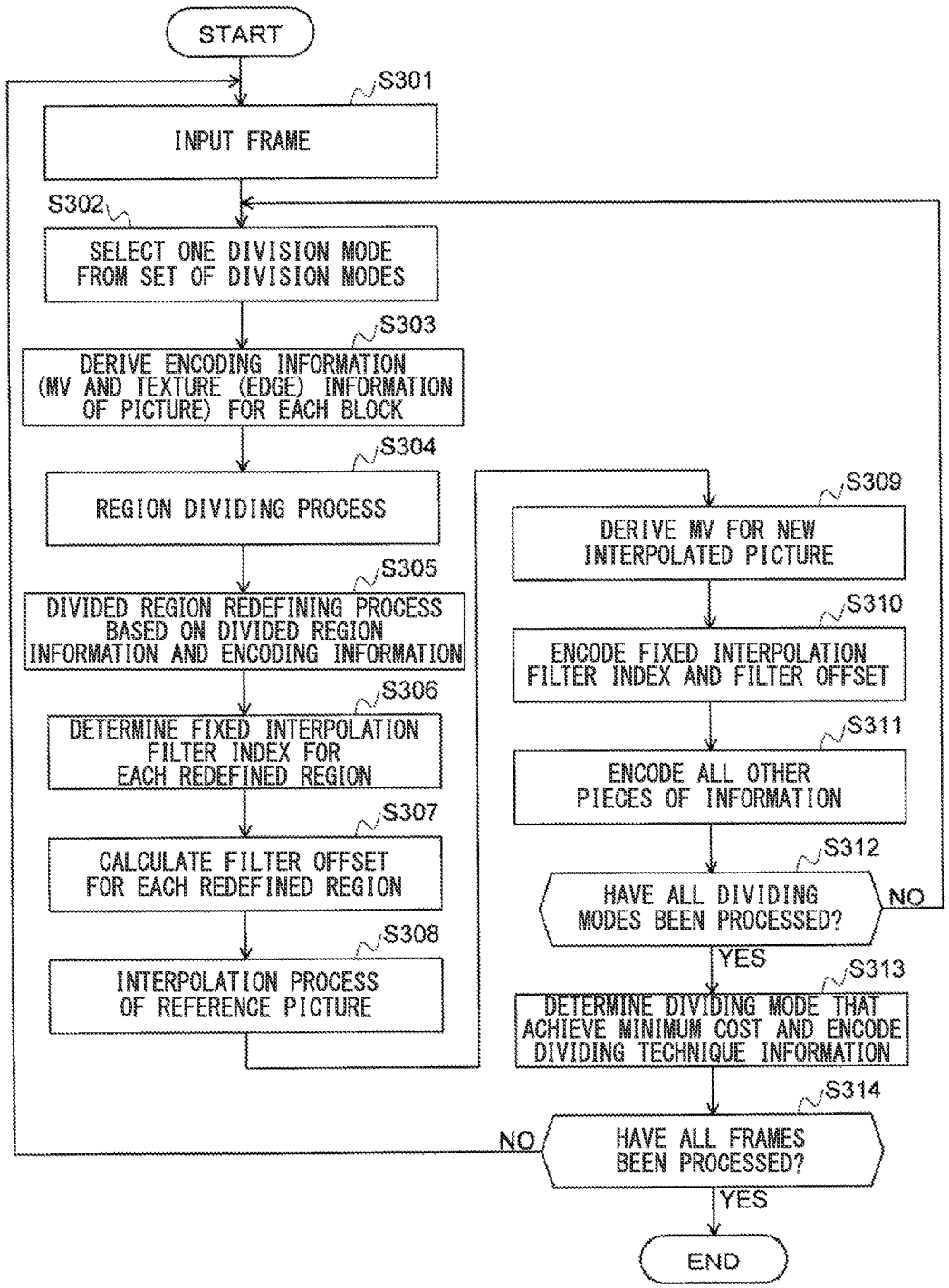
FIG. 10 is a flowchart of a video encoding process (example 3).

FIG. 10 illustrates a third example of a video encoding process executed by the video encoding apparatus 10. Hereinafter, unless otherwise specified, a description will be given assuming that luminance signals are processed; however, the process can be applied not only to luminance signals but also to chrominance signals. In this example, after division into regions is performed, the ranges of the regions are corrected by a divided region redefinition process, the optimum fixed interpolation filter and the optimum filter offset are determined for each region, and encoding is performed.

First, in step S301, a frame of an encoding target picture is input.

Subsequently, in step S302, one of predefined division modes is selected.

Subsequently, in step S303, the frame is divided into blocks, each block having, for example, a block size of m×n (m and n are positive integers) of motion prediction, and the optimum motion vector is calculated for each block. In interpolation of a fractional-accuracy pixel of a reference picture in step S303, for example, a conventional fixed 6-tap filter in accordance with the H.264/AVC is used. Moreover, in order to omit a motion search process, a motion vector designated by a block at the same position as that of the previous frame may be used.

Subsequently, in step S304, a divided region number is assigned to the current block using one or a plurality of motion vectors obtained in step S303. Similar to step S104 of the encoding process (example 1), division into regions is performed using the encoding information (motion vectors, texture information, and the like).

Subsequently, in step S305, the divided region redefinition process is performed based on the divided region information obtained in step S304. The details of the divided region redefinition process are the processes described in detail using FIG. 6 and FIG. 7.

Subsequently, in step S306, an interpolation filter is optimized for each region based on the result of the redefined division into regions in step S305. For example, in the case of a fixed interpolation filter, a plurality of indices of fixed interpolation filters that have been prepared are sequentially tested, and rate distortion costs are calculated. Here, by testing a predefined filter set, the optimum filter index is acquired. In this step, for example, an existing filter determination method such as a cost function based on square error energy can be used.

Subsequently, in step S307, an interpolation filter offset is calculated for each region based on the result of the redefined division into regions. As a method for calculating the offset, an existing method can be used. That is, the amount of change in luminance value is calculated for each region, and the filter offset is acquired.

Subsequently, in step S308, a reference picture is interpolated using the fixed interpolation filter index obtained in step S306 and the filter offset obtained in step S307.

Subsequently, in step S309, a motion vector is derived for the interpolated picture obtained in step S308.

Subsequently, in step S310, information on the fixed interpolation filter index obtained in step S306, information required for the division into regions, and information on the filter offset obtained in step S307 are encoded.

Subsequently, in step S311, the remaining pieces of information to be encoded (texture information, that is, quantization coefficient values, motion vectors, and the like) are all encoded.

Subsequently, in step S312, a check is made as to whether or not there is a division mode to be searched for other than the division mode selected in step S302. If there is a division mode to be searched for, the processing returns to step S302, a similar process is repeated, and if the processes for all the division modes to be searched for have been completed, the processing proceeds to step S313.

Subsequently, in step S313, a division mode that minimizes a rate distortion cost is determined based on the result of a loop configured by steps S302 to S312. This information is encoded and transmitted.

Subsequently, in step S314, a determination is made as to whether or not all the input picture frames have been encoded. If the encoding has not been completed, the processing returns to step S301 and proceeds to a process of the next frame. If all the frames have been encoded, the encoding process ends.

[Encoding Process (Example 4)]

Figure 11:
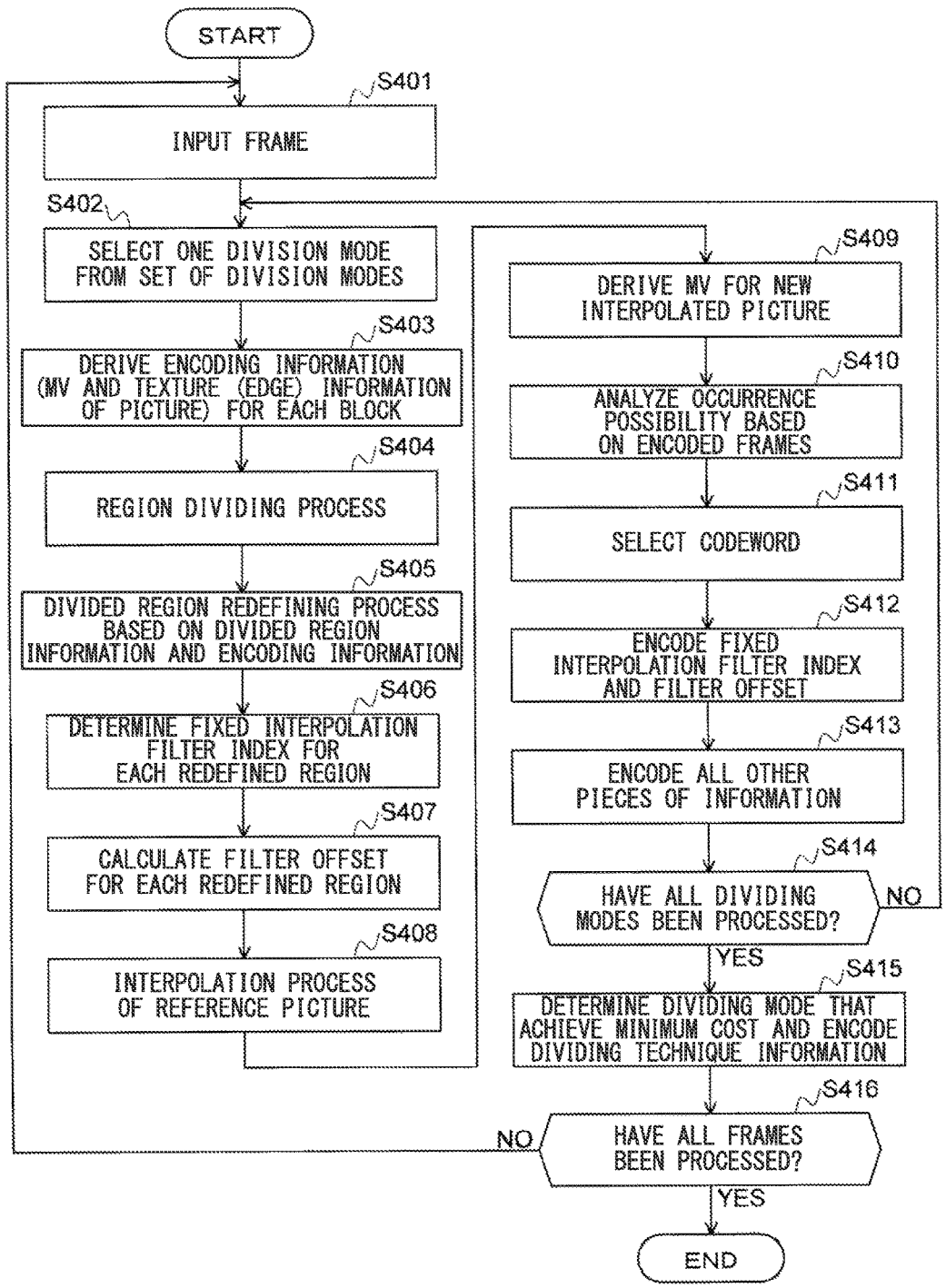
FIG. 11 is a flowchart of a video encoding process (example 4).

FIG. 11 illustrates a fourth example of a video encoding process executed by the video encoding apparatus 10. Hereinafter, unless otherwise specified, a description will be given assuming that luminance signals are processed; however, the process can be applied not only to luminance signals but also to chrominance signals. In this example, after division into regions is performed, the ranges of the regions are corrected by a divided region redefinition process, the optimum fixed interpolation filter and the optimum filter offset are determined for each region, information on encoded frames is analyzed, allocation of codewords are changed, and encoding is performed.

First, in step S401, a frame of an encoding target picture is input.

Subsequently, in step S402, one of predefined division modes is selected.

Subsequently, in step S403, the frame is divided into blocks, each block having, for example, a block size of m×n (m and n are positive integers) of motion prediction, and the optimum motion vector is calculated for each block. In interpolation of a fractional-accuracy pixel of a reference picture in step S403, for example, a conventional fixed 6-tap filter in accordance with the H.264/AVC is used. Moreover, in order to omit a motion search process, a motion vector designated by a block at the same position as that of the previous frame may be used.

Subsequently, in step S404, a divided region number is assigned to the current block using one or a plurality of motion vectors obtained step S403. Similar to step S104 of the encoding process (example 1), division into regions is performed using the encoding information (motion vectors, texture information, and the like).

Subsequently, in step S405, the divided region redefinition process is performed based on the divided region information obtained in step S404. The details of the divided region redefinition process are the processes described in detail using FIG. 6 and FIG. 7.

Subsequently, in step S406, an interpolation filter is optimized for each region based on the result of the redefined division into regions of step S405. A plurality of indices of fixed interpolation filters that have been prepared are sequentially tested, and rate distortion costs are calculated. Here, by testing a predefined filter set, the optimum filter index is acquired. In this step, for example, an existing filter determination method such as a cost function based on square error energy can be used.

Subsequently, in step S407, an interpolation filter offset is calculated for each region based on the result of the redefined division into regions. As a method for calculating the offset, an existing method can be used. That is, the amount of change in luminance value is calculated for each region, and the filter offset is acquired.

Subsequently, in step S408, a reference picture is interpolated using the fixed interpolation filter index obtained in step S406 and the filter offset obtained in step S407.

Subsequently, in step S409, a motion vector is derived for the interpolated picture obtained in step S408.

Subsequently, in step S410, encoded frames are analyzed, and the occurrence probability of an index of the selected interpolation filter set is calculated.

Subsequently, in step S411, allocation of a codeword used when the index is encoded is adjusted based on the occurrence probability obtained in step S410. For example, the allocation is performed so that an index having the maximum occurrence probability corresponds to the shortest code length.

Subsequently, in step S412, information on the fixed interpolation filter index obtained in step S406 and information on the filter offset obtained in step S407 are encoded using the codeword selected in step S411.

Subsequently, in step S413, the remaining pieces of information to be encoded (texture information, that is, quantization coefficient values, motion vectors, and the like) are all encoded.

Subsequently, in step S414, a check is made as to whether or not there is a division mode to be searched for other than the division mode selected in step S402. If there is a division mode to be searched for, the processing returns to step S402, a similar process is repeated, and if the processes for all the division modes to be searched for have been completed, the processing proceeds to step S415.

Subsequently, in step S415, a division mode that minimizes a rate distortion cost is determined based on the result of a loop configured by steps S402 to S414. This information is encoded and transmitted.

Subsequently, in step S416, a determination is made as to whether or not all the input picture frames have been encoded. If the encoding has not been completed, the processing returns to step S401 and proceeds to a process of the next frame. If all the frames have been encoded, the encoding process ends.

[Video Decoding Apparatus]

Figure 12:
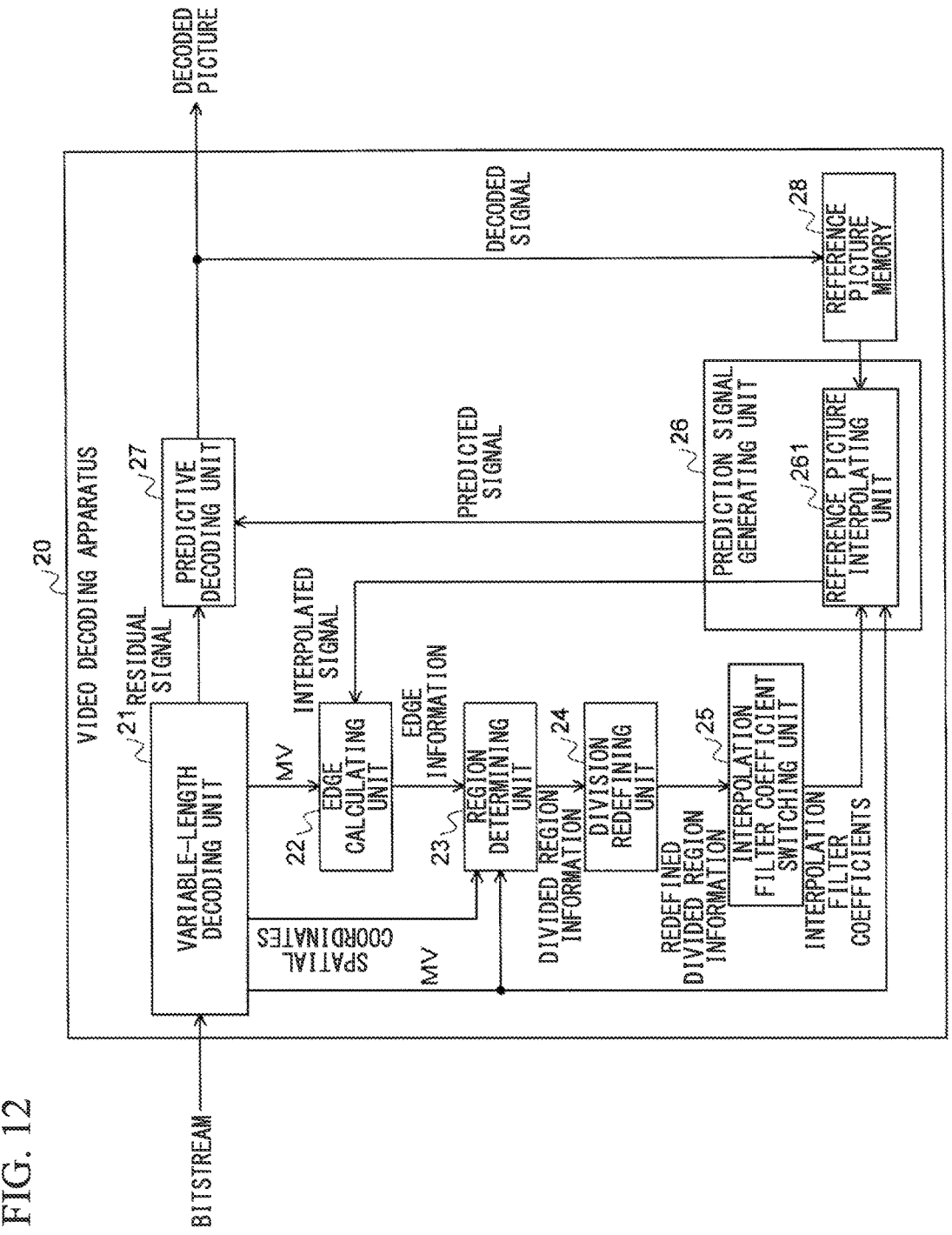
FIG. 12 is a diagram illustrating an example of a configuration of a video decoding apparatus.

FIG. 12 is a diagram illustrating an example of a configuration of a video decoding apparatus in accordance with the present invention. A video decoding apparatus 20 is an apparatus which inputs a bitstream encoded by the video encoding apparatus 10 shown in FIG. 1, switches an interpolation filter for each region obtained by division into regions that utilizes a motion vector and edge information, performs interpolation of fractional-accuracy pixels, and performs motion compensation of fractional-accuracy, thereby decoding video.

In the video decoding apparatus 20, a variable-length decoding unit 21 inputs the encoded bitstream, and decodes quantized transform coefficients, motion vectors, groups of interpolation filter coefficients, and the like. An edge calculating unit 22 extracts edge information, for example, an edge angle, or an edge angle and an edge strength, from a reference picture when motion compensation is performed. A region determining unit 23 determines regions which are units for switching the interpolation filter coefficients for a decoding target frame using the edge information calculated by the edge calculating unit 22. It is to be noted that other pieces of encoding information such as a motion vector can be used for this determination, instead of the edge information.

A division redefining unit 24 performs a divided region redefinition process that adjusts the ranges of the regions based on the divided region information determined by the region determining unit 23. An interpolation filter coefficient switching unit 25 switches the interpolation filter coefficients decoded by the variable-length decoding unit 21 for each of regions designated by the redefined divided region information defined by the division redefining unit 24.

A reference picture interpolating unit 261 in a prediction signal generating unit 26 apples an interpolation filter using the interpolation filter coefficients received from the interpolation filter coefficient switching unit 25 to a decoded reference picture stored in a reference picture memory 28 to restore fractional-accuracy pixels of the reference picture. The prediction signal generating unit 26 generates a predicted signal of a decoding target block from the reference picture for which the fractional-accuracy pixels have been restored.

A predictive decoding unit 27 performs inverse quantization of quantization coefficients decoded by the variable-length decoding unit 21, inverse orthogonal transform, and the like, sums a calculated prediction error signal and the predicted signal generated by the prediction signal generating unit 26 to generate a decode signal, and outputs it as a decoded picture. In addition, the decoded signal decoded by the predictive decoding unit 27 is stored in the reference picture memory 28 for the subsequent predictive decoding.

[Processing Flow of Video Decoding Apparatus]

Figure 13:
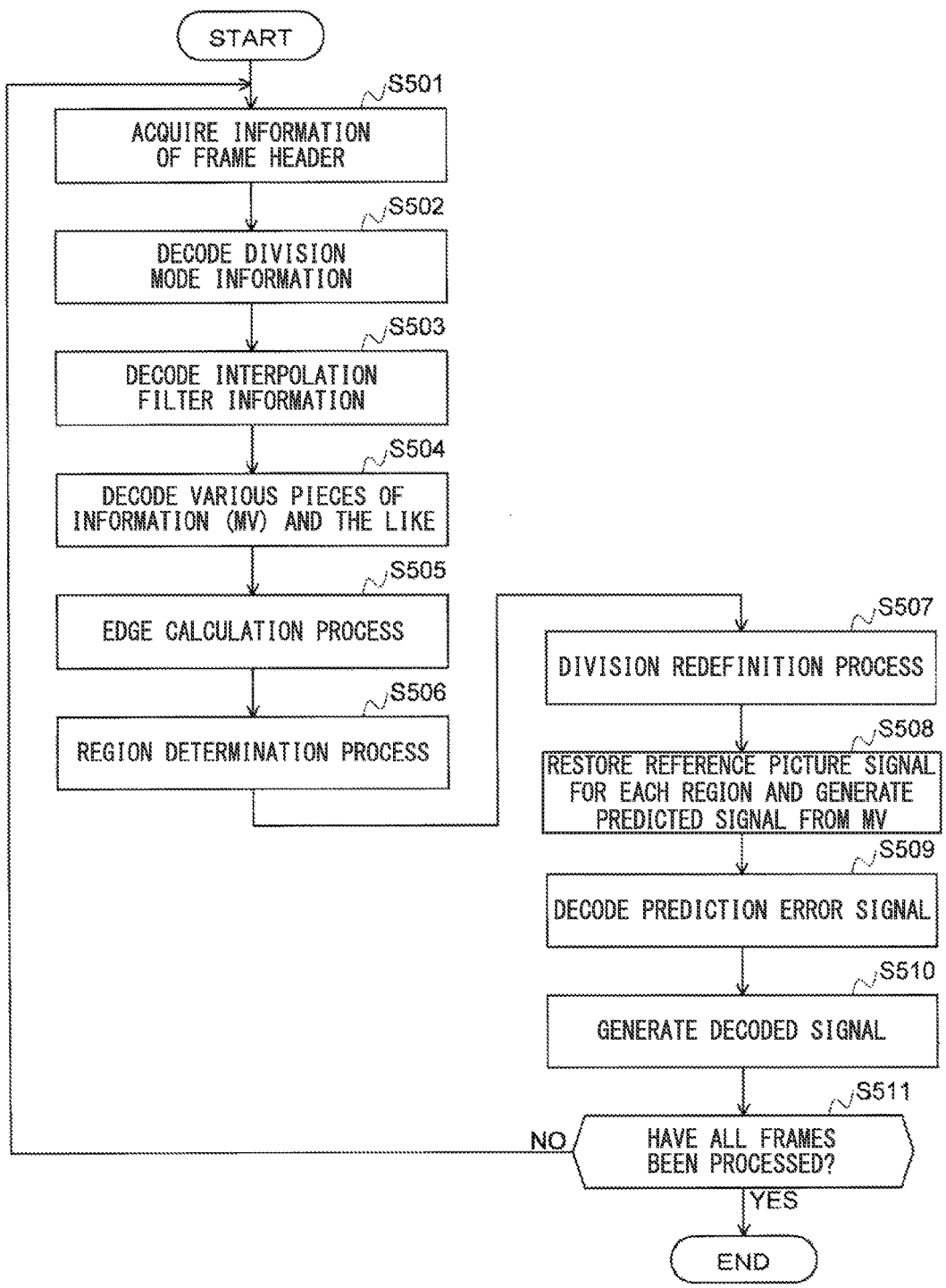
FIG. 13 is a flowchart of a video decoding process.
Figure 14:
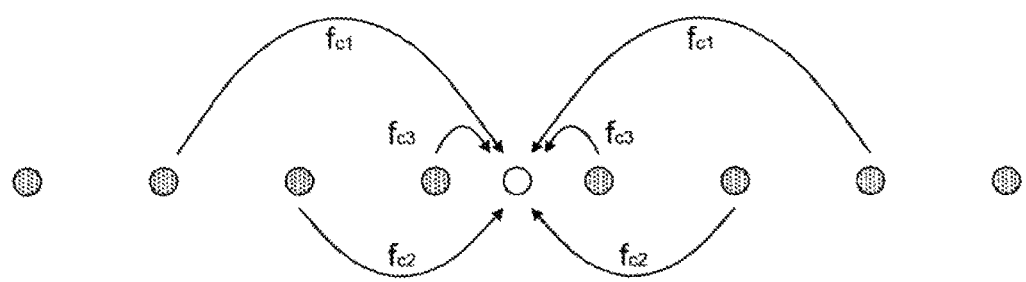
FIG. 14 is a diagram illustrating an example of a pixel interpolation method of non-integer accuracy in conventional video encoding standards.
Figure 15A:
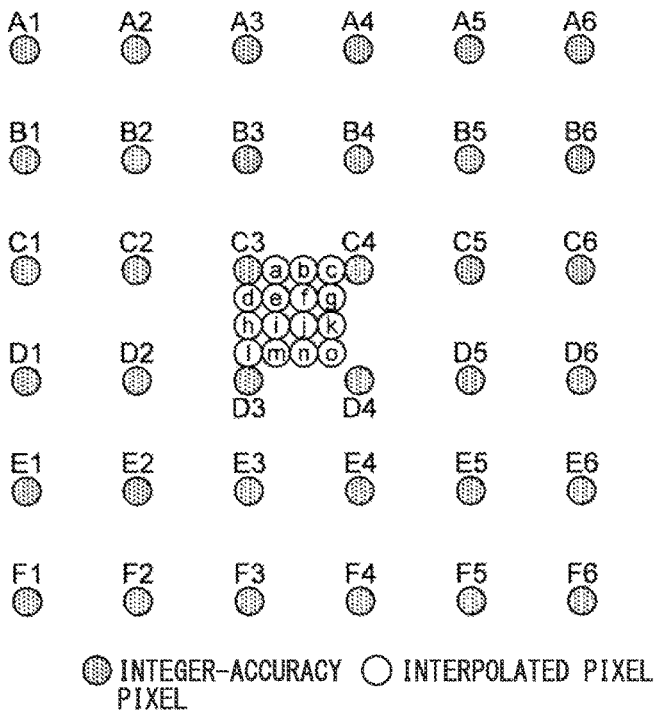
FIG. 15A is a diagram illustrating a pixel interpolation method of non-integer accuracy in a separable adaptive interpolation filter (SAIF).
Figure 15B:
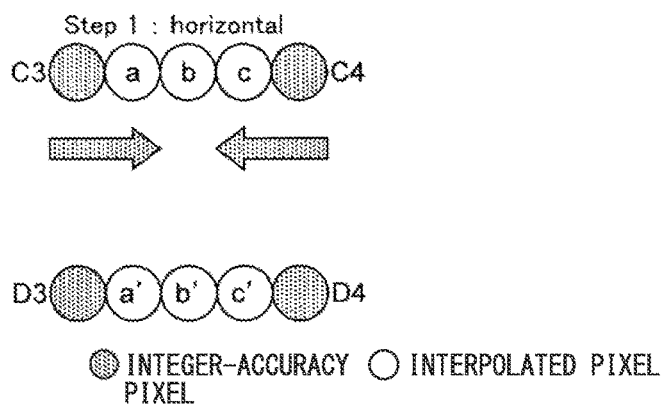
FIG. 15B is a diagram illustrating a pixel interpolation method of non-integer accuracy in a separable adaptive interpolation filter (SAIF).
Figure 15C:
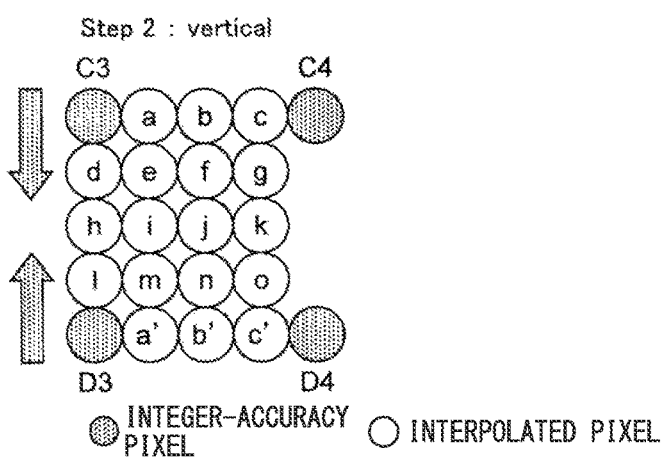
FIG. 15C is a diagram illustrating a pixel interpolation method of non-integer accuracy in a separable adaptive interpolation filter (SAIF).
Figure 16A:
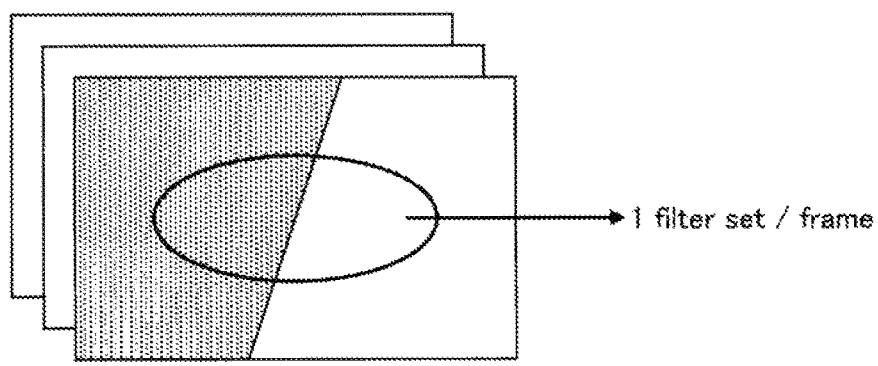
FIG. 16A is a diagram illustrating a comparison between a conventional adaptive interpolation filter and a region-dividing type adaptive interpolation filter.
Figure 16B:
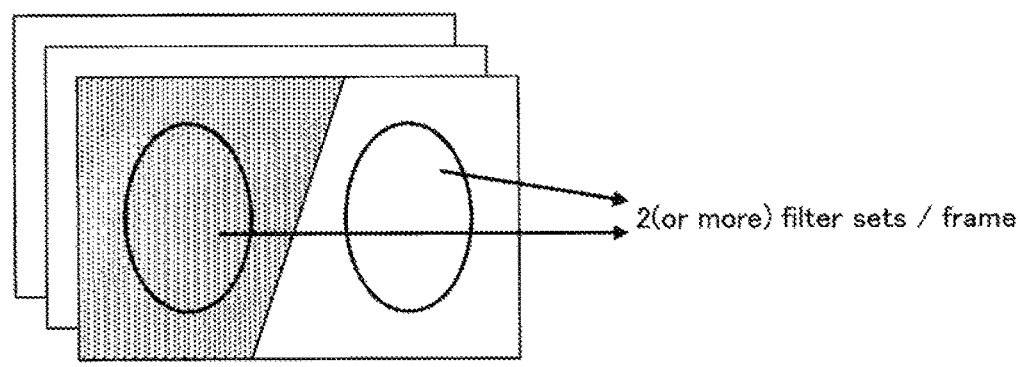
FIG. 16B is a diagram illustrating a comparison between a conventional adaptive interpolation filter and a region-dividing type adaptive interpolation filter.

FIG. 13 is a flowchart of a video decoding process executed by the video decoding apparatus 20. Hereinafter, unless otherwise specified, a description will be given assuming that luminance signals are processed; however, the process can be applied not only to luminance signals but also to chrominance signals.

First, in step S501, information of a frame header which includes various pieces of overhead information is decoded and acquired.

Subsequently, in step S502, information on a division mode is decoded from the header information of step S501.

Subsequently, in step S503, information on an interpolation filter is decoded from the header information of step S501. For example, when a fixed interpolation filter is used, an interpolation filter index and an offset are decoded. In the case of an adaptive interpolation filter, interpolation filter coefficients are decoded.

Subsequently, in step S504, encoding information such as motion vectors, reference indices, and DCT coefficients are all decoded.

Subsequently, in step S505, edges in a reference picture are calculated.

Subsequently, in step S506, the region determining unit 23 performs a region determining process based on the information on the division mode decoded in step S502 and the division modes defined in the video encoding apparatus 10. For example, when division into regions is performed in the encoding apparatus using a motion vector, division is also performed in the decoding apparatus in accordance with the same definition.

Subsequently, in step S507, a divided region redefinition process is performed based on region information obtained in step S506, and a divided region number is corrected for each block. As for the details of the flow, the same algorithm as that of the processes illustrated in FIG. 6 and FIG. 7 is used.

Subsequently, in step S508, an optimum interpolation filter index and an offset or interpolation filter coefficients decoded in step S503 are selected based on the divided region number obtained in step S507, and fractional-accuracy pixels of a reference picture are restored. After restoring the fractional-accuracy pixels, a predicted signal of a decoding target block is generated using the motion vector decoded in step S504.

Subsequently, in step S509, a prediction error signal of the decoding target block is decoded from an input bitstream.

Subsequently, in step S510, the predicted signal obtained in step S508 and the prediction error signal obtained in step S509 are summed to generate a decoded signal.

Subsequently, in step S511, a determination is made as to whether or not all the decoding processes for all the frames of the input bitstream have been completed. If the decoding has not been completed, the processing returns to step S501 and proceeds to a process of the next frame. If decoding of all the frames has been completed, the decoding process ends.

The above video encoding and video decoding processes may also be realized using a computer and a software program, the program may be recorded in a computer-readable recoding medium, and the program may be provided through a network.

As described above, embodiments of the present invention have been described in detail with reference to the drawings; however, the specific configuration is not limited to these embodiments, and designs and the like (addition, omission, replacement, and other modifications of the configuration) without departing from the gist of the present invention are also included. The present invention is not limited by the aforementioned description, and is only limited by the enclosed claims.

INDUSTRIAL APPLICABILITY

The present invention can be used, for example, in video encoding and video decoding using inter-frame prediction with motion compensation of fractional-accuracy. The present invention can perform division into regions using information on the energy of a residual signal when the division into the regions is performed and an interpolation filter is applied to each of the regions, provide a wide variety of types of division into regions, and increase the flexibility in terms of locality in a picture. Moreover, the ranges of divided regions that are divided in accordance with a region classification using encoding information can be adjusted, a wide variety of types of ranges of the regions based on which filters are switched can be provided, and the flexibility in terms of locality in a picture can be improved. Furthermore, a mechanism of reducing overhead is introduced. With the above factors, the present invention can improve the coding efficiency.

DESCRIPTION OF REFERENCE NUMERALS 10 video encoding apparatus
11 region dividing unit
12 edge calculating unit
13 divided region redefinition processing unit
14 interpolation filter coefficient switching unit
15 prediction signal generating unit
151 reference picture interpolating unit 152 motion detecting unit
16 predictive encoding unit
17 variable-length encoding unit
18 decoding unit
19 reference picture memory
20 video decoding apparatus
21 variable-length decoding unit
22 edge calculating unit
23 region determining unit
24 division redefining unit
25 interpolation filter coefficient switching unit
26 prediction signal generating unit
261 reference picture interpolating unit
27 predictive decoding unit
28 reference picture memory

The invention claimed is:

1. A video encoding method using inter-frame prediction with motion compensation of fractional-accuracy, the method comprising:
   a step of acquiring encoding information for each block which is a unit of encoding or prediction, and comprises a plurality of pixels, wherein the encoding information includes at least a motion vector and texture information;
   a step of performing a region classification on a block-by-block basis based on the acquired encoding information, the region classification classifying each block which comprises a plurality of pixels into one of regions based on a property or a feature of each block which comprises a plurality of pixels;
   a step of performing a divided region redefinition process in which a region dividing line in a horizontal direction, a region dividing line in a vertical direction, or both the region dividing line in the horizontal direction and the region dividing line in the vertical direction are shifted based on a result of the region classification, and a region dividing line with which density of blocks belonging to a particular region classification is greater than or equal to a predetermined threshold value is determined, each of the blocks comprising a plurality of pixels, the divided region redefinition process redefining provisional division obtained by the region classification;
   a step of switching an interpolation method of a fractional-accuracy pixel for each of divided regions divided by the region dividing line;
   a step of performing interpolation of the fractional-accuracy pixel for each of the divided regions;
   a step of encoding a picture using inter-frame prediction with motion compensation of fractional-accuracy for an interpolated picture; and
   a step of encoding information on the region classification.

2. The video encoding method according to claim 1, wherein the step of switching the interpolation method of the fractional-accuracy pixel comprises:
   a step of selecting one index from among indices for a plurality of sets of fixed interpolation filter coefficients which have been predefined, calculating a rate distortion cost for a region to be processed for a set of fixed interpolation filter coefficients designated by the index, and storing the rate distortion cost; and
   a step of testing all the indices for given sets of fixed interpolation filter coefficients, determining a set of fixed interpolation filter coefficients which achieves the minimum rate distortion cost, and encoding an index for the determined set of fixed interpolation filter coefficients.

3. The video encoding method according to claim 2, further comprising:
   a step of calculating, when the fixed interpolation filter coefficients are switched, an offset of at least one of a luminance signal and a chrominance signal which is used for an interpolation process for each of the divided regions;
   a step of applying the calculated offset to the divided regions and performing encoding on the resultant divided regions; and
   a step of encoding information on the calculated offset.

4. The video encoding method according to claim 2 or claim 3, wherein the step of switching the interpolation method of the fractional-accuracy pixel comprises:
   a step of collecting information of an encoded frame;
   a step of calculating the occurrence probability of an index for the set of the fixed interpolation filter coefficients based on the information of the encoded frame; and
   a step of selecting and allocating a codeword based on the calculated occurrence probability when the index is encoded.

5. A video decoding method using inter-frame prediction with motion compensation of fractional-accuracy, the method comprising:
   a step of decoding information on division into regions from encoded data;
   a step of performing a region classification on a block-by-block basis based on encoding information obtained by performing decoding on the encoded data, the region classification classifying each block which comprises a plurality of pixels into one of regions based on a property or a feature of each block which comprises a plurality of pixels, wherein the encoding information includes at least a motion vector and texture information;
   a step of performing a divided region redefinition process in which a region dividing line in a horizontal direction, a region dividing line in a vertical direction, or both the region dividing line in the horizontal direction and the region dividing line in the vertical direction are shifted based on a result of the region classification, and a region dividing line with which density of blocks belonging to a particular region classification is greater than or equal to a predetermined threshold value is determined, each of the blocks comprising a plurality of pixels, the divided region redefinition process redefining provisional division obtained by the region classification;
   a step of switching an interpolation method of a fractional-accuracy pixel for each of divided regions divided by the region dividing line;
   a step of performing interpolation of the fractional-accuracy pixel for each of the divided regions; and
   a step of decoding a picture using inter-frame prediction with motion compensation of fractional-accuracy for an interpolated picture.

6. The video decoding method according to claim 5, wherein the step of switching the interpolation method of the fractional-accuracy pixel comprises a step of decoding an index of a set of fixed interpolation filter coefficients, and the step of performing the interpolation comprises a step of performing interpolation using the set of the fixed interpolation filter coefficients corresponding to the decoded index.

7. The video decoding method according to claim 6, further comprising a step of decoding, when the fixed interpolation filter coefficients are switched, an offset of at least one of a luminance signal and a chrominance signal used for an interpolation process for each of the divided regions,
wherein the step of performing the interpolation applies the decoded offset to the divided regions and performs interpolation.

8. The video decoding method according to claim 6 or claim 7, wherein the step of switching the interpolation method of the fractional-accuracy pixel comprises:
a step of collecting information of a decoded frame;
a step of calculating the occurrence probability of an index for the set of the fixed interpolation filter coefficients based on the information of the decoded frame; and
a step of selecting a codeword for the index based on the calculated occurrence probability when the index is decoded.

9. A video encoding apparatus using inter-frame prediction with motion compensation of fractional-accuracy, the apparatus comprising:
an encoding information acquiring unit which acquires encoding information for each block which is a unit of encoding or prediction, and comprises a plurality of pixels, wherein the encoding information includes at least a motion vector and texture information;
a region classification unit which performs a region classification on a block-by-block basis based on the acquired encoding information, the region classification classifying each block which comprises a plurality of pixels into one of regions based on a property or a feature of each block which comprises a plurality of pixels;
a divided region redefinition processing unit which performs a divided region redefinition process in which a region dividing line in a horizontal direction, a region dividing line in a vertical direction, or both the region dividing line in the horizontal direction and the region dividing line in the vertical direction are shifted based on a result of the region classification, and a region dividing line with which density of blocks belonging to a particular region classification is greater than or equal to a predetermined threshold value is determined, each of the blocks comprising a plurality of pixels, the divided region redefinition process redefining provisional division obtained by the region classification;
an interpolation method switching unit which switches an interpolation method of a fractional-accuracy pixel for each of divided regions divided by the region dividing line;
an interpolation performing unit which performs interpolation of the fractional-accuracy pixel for each of the divided regions;
a picture encoding unit which encodes a picture using inter-frame prediction with motion compensation of fractional-accuracy for an interpolated picture; and
a region classification information encoding unit which encodes information on the region classification.

10. The video encoding apparatus according to claim 9, wherein the interpolation method switching unit comprises:
a cost storage unit which selects one index from among indices for a plurality of sets of fixed interpolation filter coefficients which have been predefined, calculates a rate distortion cost for a region to be processed for a set of fixed interpolation filter coefficients designated by the index, and stores the rate distortion cost; and
an index encoding unit which tests all the indices for given sets of fixed interpolation filter coefficients, determines a set of fixed interpolation filter coefficients which achieves the minimum rate distortion cost, and encodes an index for the determined set of fixed interpolation filter coefficients.

11. The video encoding apparatus according to claim 10, further comprising:
an offset calculating unit which calculates, when the fixed interpolation filter coefficients are switched, an offset of at least one of a luminance signal and a chrominance signal which is used for an interpolation process for each of the divided regions;
an encoding performing unit which applies the calculated offset to the divided regions and performs encoding on the resultant divided regions; and
an offset information encoding unit which encodes information on the calculated offset.

12. The video encoding apparatus according to claim 10 or claim 11, wherein the interpolation method switching unit comprises:
a collecting unit which collects information of an encoded frame;
an occurrence probability calculating unit which calculates the occurrence probability of an index for the set of the fixed interpolation filter coefficients based on the information of the encoded frame; and
a codeword allocation unit which selects and allocates a codeword based on the calculated occurrence probability when the index is encoded.

13. A video decoding apparatus using inter-frame prediction with motion compensation of fractional-accuracy, the apparatus comprising:
a divided region information decoding unit which decodes information on division into regions from encoded data;
a region classification unit which performs a region classification on a block-by-block basis based on encoding information obtained by performing decoding on the encoded data, the region classification classifying each block which comprises a plurality of pixels into one of regions based on a property or a feature of each block which comprises a plurality of pixels, wherein the encoding information includes at least a motion vector and texture information;
a divided region redefinition processing unit which performs a divided region redefinition process in which a region dividing line in a horizontal direction, a region dividing line in a vertical direction, or both the region dividing line in the horizontal direction and the region dividing line in the vertical direction are shifted based on a result of the region classification, and a region dividing line with which density of blocks belonging to a particular region classification is greater than or equal to a predetermined threshold value is determined, each of the blocks comprising a plurality of pixels, the divided region redefinition process redefining provisional division obtained by the region classification;

an interpolation method switching unit which switches an interpolation method of a fractional-accuracy pixel for each of divided regions divided by the region dividing line;

an interpolation performing unit which performs interpolation of the fractional-accuracy pixel for each of the divided regions; and a picture decoding unit which decodes a picture using inter-frame prediction with motion compensation of fractional-accuracy for an interpolated picture.

14. The video decoding apparatus according to claim 13, wherein the interpolation method switching unit decodes an index of a set of fixed interpolation filter coefficients, and the interpolation performing unit performs interpolation using the set of the fixed interpolation filter coefficients corresponding to the decoded index.

15. The video decoding apparatus according to claim 14, further comprising an offset decoding unit which decodes, when the fixed interpolation filter coefficients are switched, an offset of at least one of a luminance signal and a chrominance signal used for an interpolation process for each of the divided regions, wherein the interpolation performing unit applies the decoded offset to the divided regions and performs interpolation.

16. The video decoding apparatus according to claim 14 or claim 15, wherein the interpolation method switching unit comprises:

a collecting unit which collects information on a decoded frame;

an occurrence probability calculating unit which calculates the occurrence probability of an index for the set of the fixed interpolation filter coefficients based on the information of the decoded frame; and a codeword selecting unit which selects a codeword for the index based on the calculated occurrence probability when the index is decoded.

17. A non-transitory computer-readable recording medium storing a video encoding program which causes a computer to execute the video encoding method according to any one of claim 1 to claim 3.

18. A non-transitory computer-readable recording medium storing a video decoding program which causes a computer to execute the video decoding method according to any one of claim 5 to claim 7.

19. A non-transitory computer-readable recording medium storing a video encoding program which causes a computer to execute the video encoding method according to claim 4.

20. A non-transitory computer-readable recording medium storing a video decoding program which causes a computer to execute the video decoding method according to claim 8.

* * * * *